US012341580B2

(12) United States Patent
La Sita et al.

(10) Patent No.: US 12,341,580 B2
(45) Date of Patent: *Jun. 24, 2025

(54) MIMO CHANNEL ACCESS

(71) Applicant: INTERDIGITAL PATENT HOLDINGS, INC., Wilmington, DE (US)

(72) Inventors: Frank La Sita, Long Beach, NY (US); Hanqing Lou, Syosset, NY (US); Oghenekome Oteri, San Diego, CA (US); Alphan Sahin, Westbury, NY (US); Li-Hsiang Sun, San Diego, CA (US); Xiaofei Wang, North Caldwell, NY (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,384

(22) Filed: Dec. 12, 2023

(65) Prior Publication Data

US 2024/0120972 A1 Apr. 11, 2024

Related U.S. Application Data

(63) Continuation of application No. 17/667,144, filed on Feb. 8, 2022, now Pat. No. 11,843,428, which is a
(Continued)

(51) Int. Cl.
*H04B 7/06* (2006.01)
*H04B 7/0417* (2017.01)
(Continued)

(52) U.S. Cl.
CPC ......... *H04B 7/0417* (2013.01); *H04B 7/0486* (2013.01); *H04B 7/0617* (2013.01);
(Continued)

(58) Field of Classification Search
CPC .. H04B 17/318; H04B 17/336; H04B 7/0417; H04B 7/0486; H04B 7/0617;
(Continued)

(56) References Cited

U.S. PATENT DOCUMENTS 9,271,293 B2 2/2016 Sutskover et al.
10,080,240 B2 9/2018 Choi et al.
(Continued)

FOREIGN PATENT DOCUMENTS

WO 2017/044420 3/2017

OTHER PUBLICATIONS

Chen et al., "MU-MIMO Power Save for 11ay," IEEE 802.11-17/1214r0 (Aug. 30, 2017).
(Continued)

*Primary Examiner* — Robert J Lopata
(74) *Attorney, Agent, or Firm* — VOLPE KOENIG

(57) ABSTRACT

Methods and apparatuses for multiple input-multiple output (MIMO) channel access are provided herein. A method performed by a station (STA) may include receiving, from an initiating STA, a frame including information indicating a broadcast address and a control trailer. The control trailer may include information indicating that a multi-user multiple input-multiple output (MU-MIMO) frame is to be received from the initiating STA, and information indicative of a plurality of STAs, the plurality of STAs including the STA. The method may include transmitting a response frame to the indicated broadcast address based on the received frame and receiving the MU-MIMO frame from the initiating STA.

20 Claims, 20 Drawing Sheets

Related U.S. Application Data continuation of application No. 16/611,188, filed as application No. PCT/US2018/030827 on May 3, 2018, now Pat. No. 11,245,443.

(60) Provisional application No. 62/552,744, filed on Aug. 31, 2017, provisional application No. 62/529,213, filed on Jul. 6, 2017, provisional application No. 62/511,799, filed on May 26, 2017, provisional application No. 62/501,844, filed on May 5, 2017.

(51) Int. Cl.
| | |
|---|---|
| *H04B 7/0456* | (2017.01) |
| *H04B 7/08* | (2006.01) |
| *H04B 17/318* | (2015.01) |
| *H04B 17/336* | (2015.01) |
| *H04W 80/08* | (2009.01) |

(52) U.S. Cl.
CPC ........... *H04B 7/0684* (2013.01); *H04B 7/088* (2013.01); *H04B 17/318* (2015.01); *H04B 17/336* (2015.01); *H04W 80/08* (2013.01)

(58) Field of Classification Search
CPC .... H04B 7/0684; H04B 7/0695; H04B 7/088; H04W 80/08
USPC ......................................................... 370/329
See application file for complete search history.

(56) References Cited

U.S. PATENT DOCUMENTS

| | | | | |
|---|---|---|---|---|
| 10,097,315 | B2 | 10/2018 | Zhou et al. | |
| 2011/0261708 | A1* | 10/2011 | Grandhi | H04W 24/10 370/252 |
| 2013/0301454 | A1 | 11/2013 | Seol et al. | |
| 2015/0244432 | A1 | 8/2015 | Wang | |
| 2016/0165630 | A1 | 6/2016 | Oteri et al. | |
| 2016/0233903 | A1* | 8/2016 | Wu | H04L 5/16 |
| 2016/0315754 | A1* | 10/2016 | Wu | H04L 5/0062 |
| 2017/0111095 | A1* | 4/2017 | Maltsev | H04B 7/063 |
| 2017/0150493 | A1* | 5/2017 | Seok | H04B 7/0452 |
| 2017/0201298 | A1* | 7/2017 | Cariou | H04W 72/0446 |
| 2017/0295499 | A1* | 10/2017 | Guo | H04W 72/1215 |
| 2017/0295595 | A1* | 10/2017 | Yang | H04W 74/0816 |
| 2018/0063794 | A1* | 3/2018 | Sanderovich | H04W 52/243 |
| 2018/0070353 | A1* | 3/2018 | Yang | H04W 74/0808 |
| 2018/0176123 | A1* | 6/2018 | Abdallah | H04L 45/24 |
| 2018/0191069 | A1* | 7/2018 | Cariou | H04L 5/0053 |
| 2018/0198508 | A1* | 7/2018 | Kasher | H04B 7/0617 |
| 2019/0068258 | A1* | 2/2019 | Oteri | H04L 25/0204 |
| 2019/0068271 | A1* | 2/2019 | Lou | H04B 7/0684 |
| 2019/0174328 | A1* | 6/2019 | Park | H04L 5/0048 |
| 2019/0199499 | A1* | 6/2019 | Da Silva | H04L 27/2602 |
| 2019/0200388 | A1* | 6/2019 | Park | H04W 72/12 |
| 2020/0067577 | A1* | 2/2020 | Lou | H04B 7/0417 |
| 2020/0382173 | A1* | 12/2020 | Park | H04L 5/001 |
| 2021/0006301 | A1* | 1/2021 | Yang | H04L 5/0055 |
| 2021/0028831 | A1* | 1/2021 | Lou | H04B 7/0452 |
| 2021/0143887 | A1* | 5/2021 | Oteri | H04B 7/0695 |
| 2022/0294515 | A1* | 9/2022 | Oteri | H04L 5/0048 |

OTHER PUBLICATIONS

Cordeiro, "Specification Framework for TGay," IEEE 802.11-15/01358r8 (Oct. 8, 2016).

Draft Standard for Information Technology—Telecommunications and Information Exchange Between Systems—Local and Metropolitan Area Networks—Specific Requirements—Part 11: Wireless LAN Medium Access Channel (MAC) and Physical Layer (PHY) Specifications—Amendment 7: Enhanced throughput for operation in license-exempt bands above 45 GHz, IEEE P802.11ay/D0.2 (Jan. 2017).

Draft Standard for Information Technology—Telecommunications and Information Exchange Between Systems—Local and Metropolitan Area Networks—Specific Requirements—Part 11: Wireless LAN Medium Access Channel (MAC) and Physical Layer (PHY) Specifications—Amendment 7: Enhanced throughput for operation in license-exempt bands above 45 GHz, IEEE P802.11ay/D1.2 (Apr. 2018).

Han et al., "[Draft text for MU-MIMO channel access flow]," IEEE 802.11-17/1409r0 (Sep. 8, 2017).

Huang et al., "MU-MIMO BF Selection," IEEE 802.11-17/1184r2 (Aug. 9, 2017).

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Sun et al., "Discussion on Rank Adaptation" IEEE 802.11-17/1253 (Aug. 2017).

Sun et al., "Draft text for rank adaptation" IEEE 802.11-17/1254 (Aug. 2017).

* cited by examiner

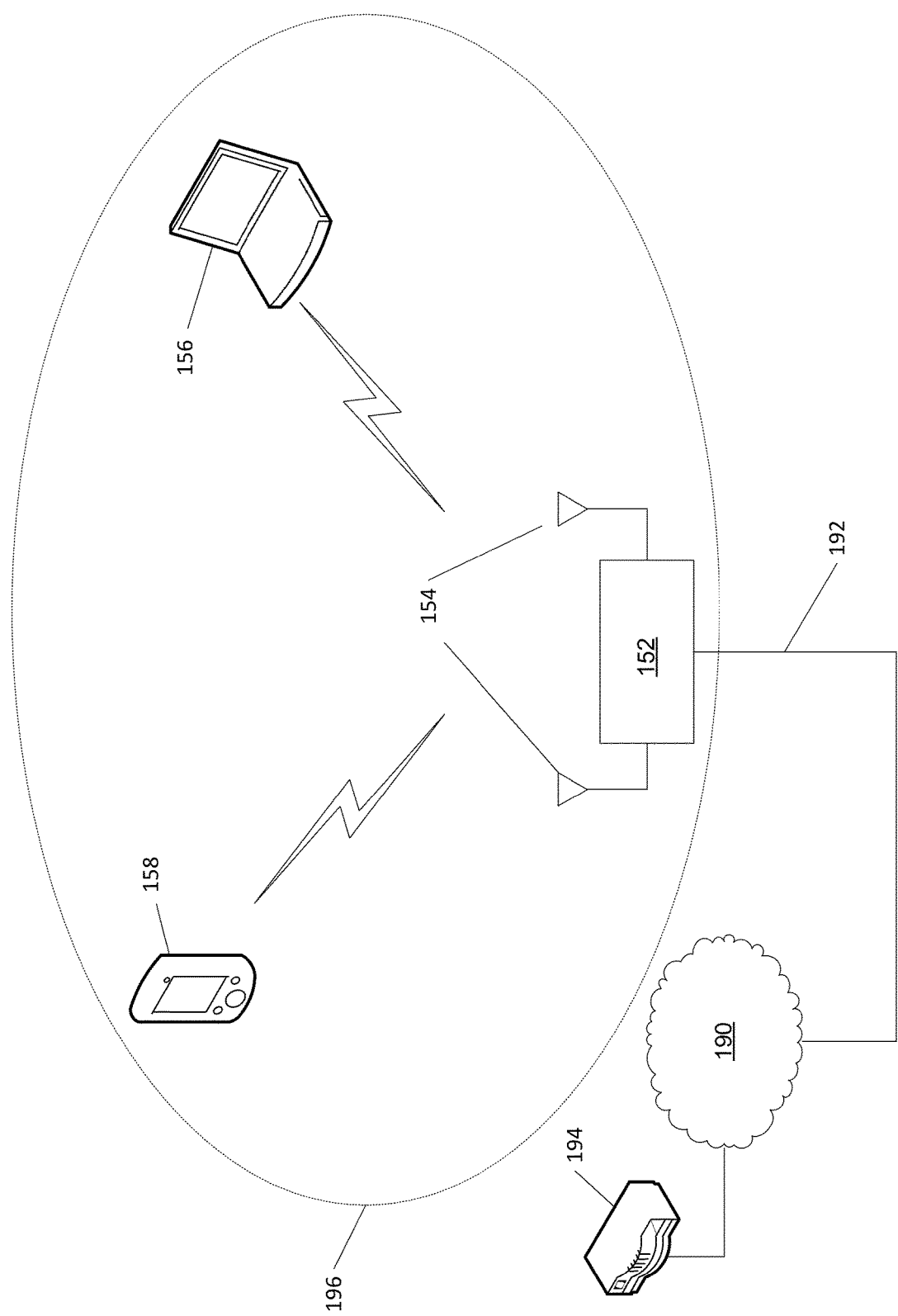

FIG. 4

| Frame Control | Duration | RA | TA | SSW | SSW Feedback | FCS |
|---|---|---|---|---|---|---|
| 2 | 2 | 6 | 6 | 3 | 3 | 4 |

Octets:

FIG. 5

| Direction | CDOWN | Sector ID | DMG Antenna ID | RXSS Length | |
|---|---|---|---|---|---|
| B0 | B1 ... B9 | B10 ... B15 | B16 B17 | B18 ... B23 | |
| 1 | 9 | 6 | 2 | 6 | |

Bits:

| Total Sectors in ISS | Number of RX DMG Antennas | Reserved | Poll Required | Reserved |
|---|---|---|---|---|
| B0 ... B8 | B9 B10 | B11 ... B15 | B16 | B17 ... B23 |
| 9 | 2 | 5 | 1 | 7 |

Bits:

FIG. 6

| Selector Select | DMG Antenna Select | SNR Report | Poll Required | Reserved |
|---|---|---|---|---|
| B0 ... B5 | B6 B7 | B8 ... B15 | B16 | B17 ... B23 |
| 6 | 2 | 8 | 1 | 7 |

Bits:

MIMO CHANNEL ACCESS

CROSS-REFERENCE TO RELATED APPLICATIONS

This application is a continuation of U.S. patent application Ser. No. 17/667,144 filed Feb. 8, 2022, which issued as U.S. Pat. No. 11,843,428 on Dec. 12, 2023, which is a continuation of U.S. patent application Ser. No. 16/611,188 filed Nov. 5, 2019, which issued as U.S. Pat. No. 11,245,443 on Feb. 8, 2022, which is the U.S. National Stage, under 35 U.S.C. § 371, of International Application No. PCT/US2018/030827 filed May 3, 2018, which claims the benefit of U.S. Provisional Application Ser. No. 62/501,844 filed May 5, 2017, U.S. Provisional Application Ser. No. 62/511,799 filed May 26, 2017, U.S. Provisional Application Ser. No. 62/529,213 filed Jul. 6, 2017, and U.S. Provisional Application Ser. No. 62/552,744 filed Aug. 31, 2017, the contents of which are incorporated by reference herein.

BACKGROUND

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more wireless transmit receive units (WTRUs), e.g., stations (STAs), may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs. STA to STA communication may occur in a WLAN system. An AP may act in the role of a STA in a WLAN system. Beamforming may be used by WLAN devices.

SUMMARY

Methods and apparatuses for multiple input-multiple output (MIMO) channel access are provided herein. A method performed by a station may include receiving, from an access point (AP), a frame including information indicating a broadcast address. The frame may further include a control trailer including information indicating that a multi-user multiple input-multiple output (MU-MIMO) frame is to be transmitted by the AP and information indicative of a designation of a plurality of STAs, the plurality of STAs including the STA. The frame may solicit response frames from at least the designated plurality of STAs. The method may further include transmitting a response frame to the indicated broadcast address and receiving the MU-MIMO frame from the AP.

A single input single output (SISO) data transmission may solicit multiple input multiple output (MIMO) rank adaptation information. A number of transmit chains for transmission may be determined. For example, the number of transmit chains for transmission may be determined by an access point (AP). The determined number of transmit chain may be included in a header of an enhanced directional multi-gigabit (EDMG) PPDU.

A physical layer convergence procedure (PLOP) protocol data unit (PPDU) may be transmitted. For example, PPDU (e.g., first PPDU) may be transmitted to a station (STA), e.g., by an AP. The PPDU may be an EDMG PPDU. The PPDU may include data and training (TRN) sequences. The TRN sequences may include orthogonal TRN sequences. In examples, the number of TRN sequences may be associated with the number of transmit chains. In examples, the number of TRN sequences may be equal to the number of transmit chains. The PPDU may include information associated with the determined number of transmit chains for transmission.

Feedback may be received. For example, the feedback may be sent from the STA that receives the PPDU with TRN sequences. In examples, the feedback may include information that identifies a transmit chain associated with the transmitted TRN sequences. In examples, the feedback may include a channel measurement associated with the identified transmit chain. In examples, the feedback may include a directional multi-gigabit (DMG) PPDU. For example, the feedback may include a DMG PPDU with a SISO or a MIMO beamformed beams.

A PPDU (e.g., subsequent PPDU) may be transmitted to the STA. For example, a subsequent PPDU may be transmitted to the STA based on the channel measurement associated with the identified transmit chain from the received feedback. The subsequent PPDU (e.g., data associated with the subsequent PPDU) transmitted using the identified transmit chain may have increased, reduced, or equal rank to the data transmitted with the PPDU (e.g., first PPDU).

BRIEF DESCRIPTION OF THE DRAWINGS

FIG. 1E illustrates exemplary wireless local area network (WLAN) devices

FIG. 4 is an example format for a selection sector sweep frame.

FIG. 5 is an example format for a sector sweep (SSW) field in an SSW frame.

FIG. 6 is an example of an SSW feedback field in an SSW frame.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
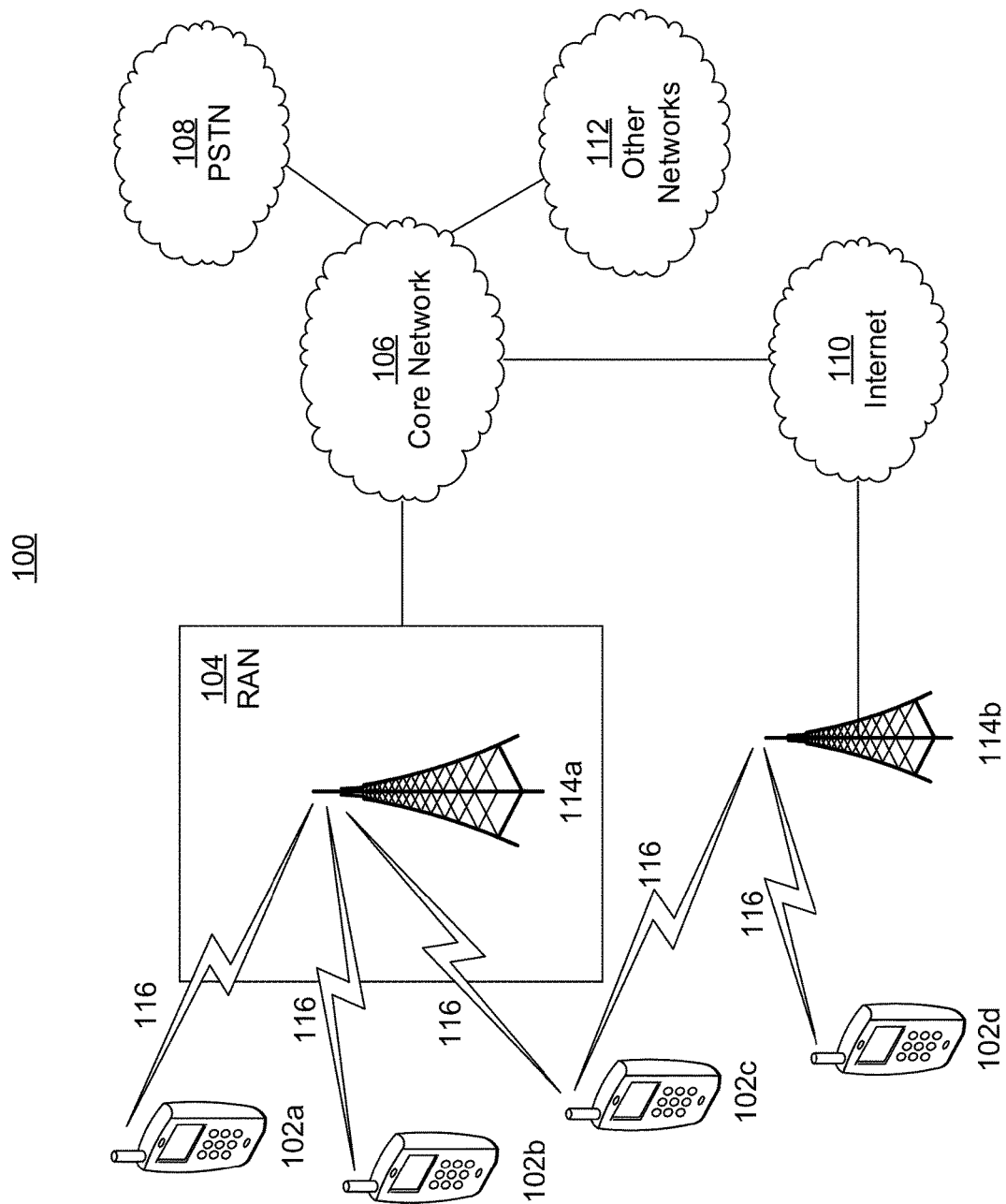
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micro7meter wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
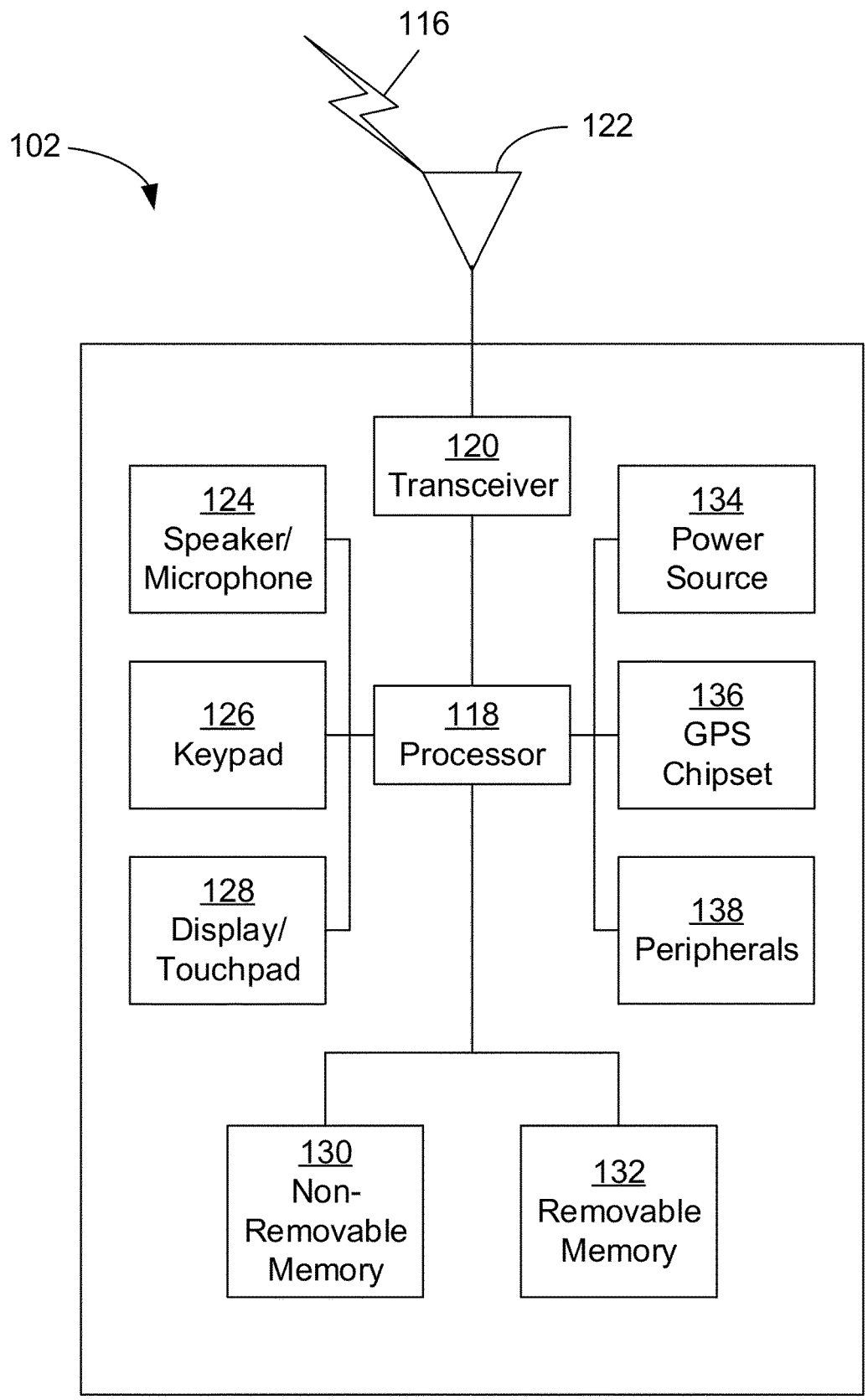
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
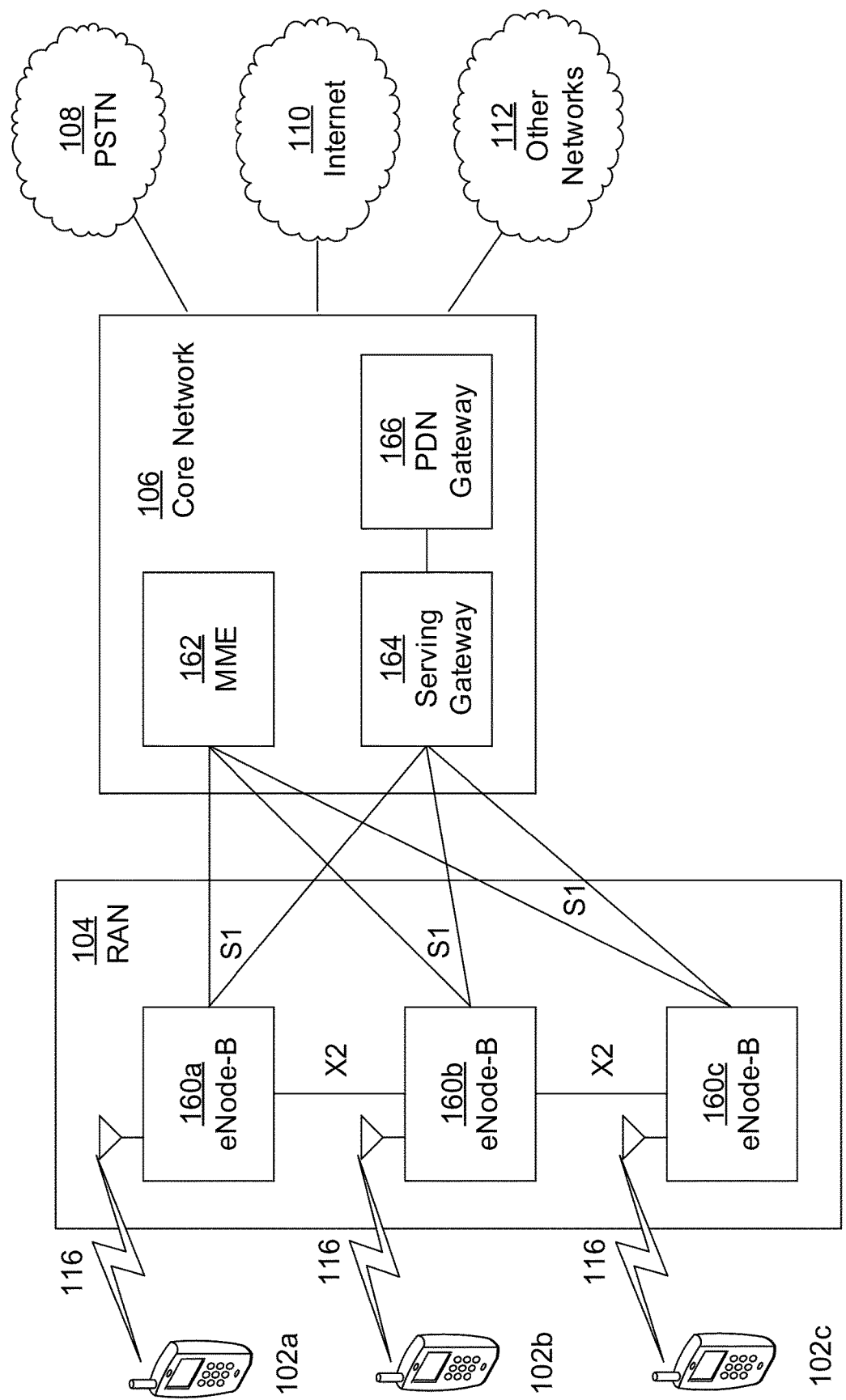
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1E as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
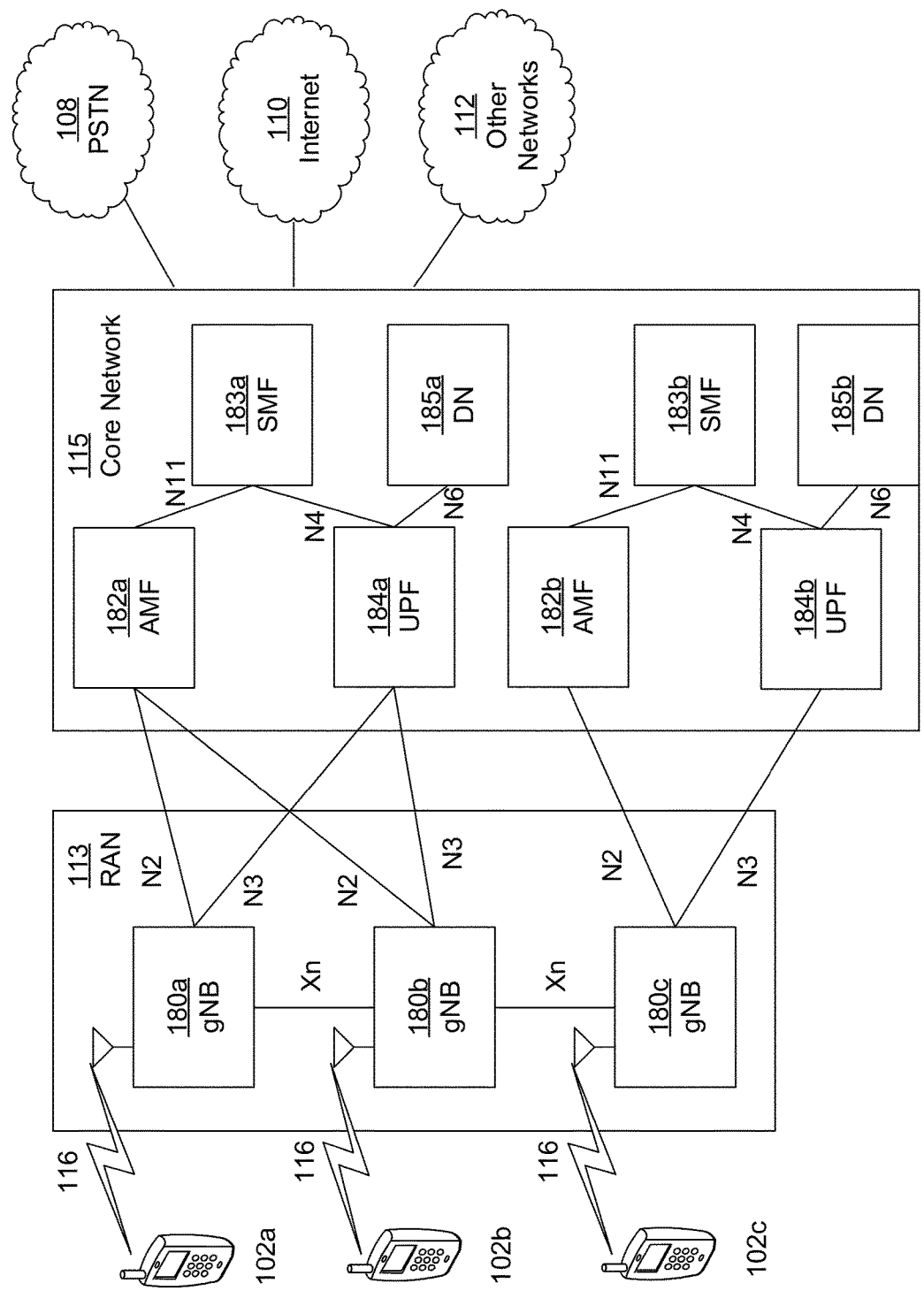
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

FIG. 1E illustrates exemplary wireless local area network (WLAN) devices. One or more of the devices may be used to implement one or more of the features described herein. The WLAN may include, but is not limited to, access point (AP) 152, station (STA) 156, and STA 158. STA 156 and 158 may be associated with AP 152. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN may have an Infrastructure Basic Service Set (BSS) mode that may have an Access Point (AP/PCP) for the BSS and one or more stations (STAs) associated with the AP/PCP. An AP/PCP may have an access or interface to a Distribution System (DS) or another type of wired/wireless network that may carry traffic in and out of the BSS. Traffic to STAs that may originate from outside a BSS may arrive through an AP/PCP and may be delivered to the STAs. Traffic that may originate from STAs to destinations outside the BSS may be sent to the AP/PCP and may be delivered to the respective destinations. Traffic between STAs within the BSS may (e.g., also) be sent through the AP/PCP where the source STA may send traffic to the AP/PCP and the AP/PCP may deliver the traffic to the destination STA. Traffic between STAs within a BSS may be peer-to-peer traffic. Peer-to-peer traffic may be sent between source and destination STAs with a direct link setup (DLS), which may use an 802.11e DLS or an 802.11z tunneled DLS (TDLS) and may be sent directly. A WLAN may use an Independent BSS (IBSS) mode. A WLAN may have no AP/PCP and/or STAs. A WLAN may communicate directly with another WLAN. This mode of communication may be referred to as an "ad-hoc" mode of communication.

An AP/PCP may use an 802.11ac infrastructure mode of operation. An AP/PCP may transmit a beacon and may do so on a fixed channel. A fixed channel may be the primary channel. A channel may be 20 MHz wide and may be the operating channel of the BSS. A channel may be used by STAs and may be used to establish a connection with the AP/PCP. A (e.g., fundamental) channel access mechanism in an 802.11 system may be Carrier Sense Multiple Access with Collision Avoidance (CSMA/CA). A (e.g., every) STA (e.g., including an AP/PCP), may sense the primary channel, for example, in CSMA/CA. A channel may be detected to be busy. A STA may back off, for example, when a channel is detected to be busy. A STA may transmit at any given time in a given BSS (e.g., using CSMA/CA).

802.11ad may support MAC and physical (PHY) layers for very high throughput (VHT), e.g., in the 60 GHz band. 802.11ad may support data rates up to 7 Gbits/s. 802.11ad may support (e.g., three) different modulation modes (e.g., control PHY with single carrier and spread spectrum, single carrier PHY, and OFDM PHY). 802.11ad may use a 60 GHz unlicensed band and/or a band that that may be available globally. At 60 GHz, wavelength is 5 mm. Compact antennas or antenna arrays may be used with 60 GHz. An antenna may create narrow RF beams (e.g., at both transmitter and receiver). Narrow RF beams may increase coverage range and may reduce interference.

Figure 2:
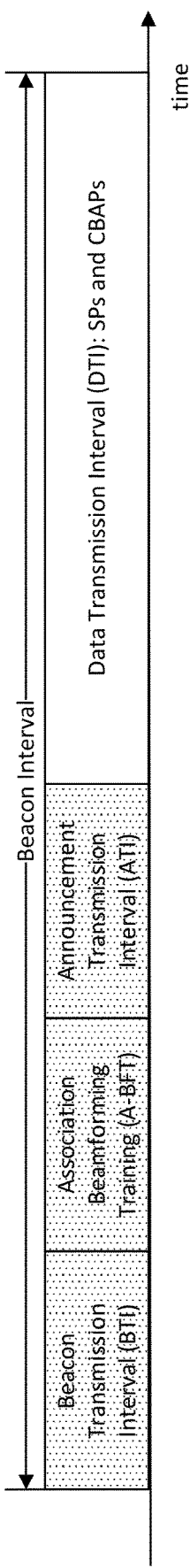
FIG. 2 is an example of a beacon interval.

FIG. 2 is an example of a beacon interval (BI). A beacon internal (e.g., in IEEE 802.11ad) may be composed of multiple intervals (e.g., as shown by example in FIG. 2), such as a Beacon Transmission Interval (BTI), Association Beamforming Training (A-BFT), Announcement Transmission Interval (ATI), and Data Transmission Interval (DTI). The first three intervals (e.g., shaded in FIG. 2) may be referred to collectively as a Beacon Header Interval (BHI).

A BTI may include multiple beacon frames that are transmitted by a PCP/AP on a different sector to cover one or more (e.g., all) possible directions. A BTI interval may be used for network announcement and beamforming training of an antenna sector(s) for PCP/AP.

A-BFT may be used by stations to train their antenna sector for communication with a PCP/AP.

A PCP/AP may (e.g., in ATI) exchange management information with associated and beam-trained stations.

A DTI may include one or more contention-based access periods (CBAPs) and scheduled service periods (SPs) where stations may exchange data frames. Multiple stations may (e.g., in CBAP) contend for a channel, for example, according to an IEEE 802.11 enhanced distributed coordination function (EDCF). An SP may be assigned for communication between a dedicated pair of nodes, e.g., as a contention free period.

The frame structure of 802.11ad may facilitate a mechanism for beamforming training (e.g., discovery and tracking). A beamforming training protocol may include multiple (e.g., two) components, e.g., a sector level sweep (SLS) procedure and a beam refinement protocol (BRP) procedure. An SLS procedure may be used for transmitting, e.g., beamforming training. A BRP procedure may enable receipt of beamforming training and (e.g., iterative) refinement of transmit and/or receive beams.

Figure 3:
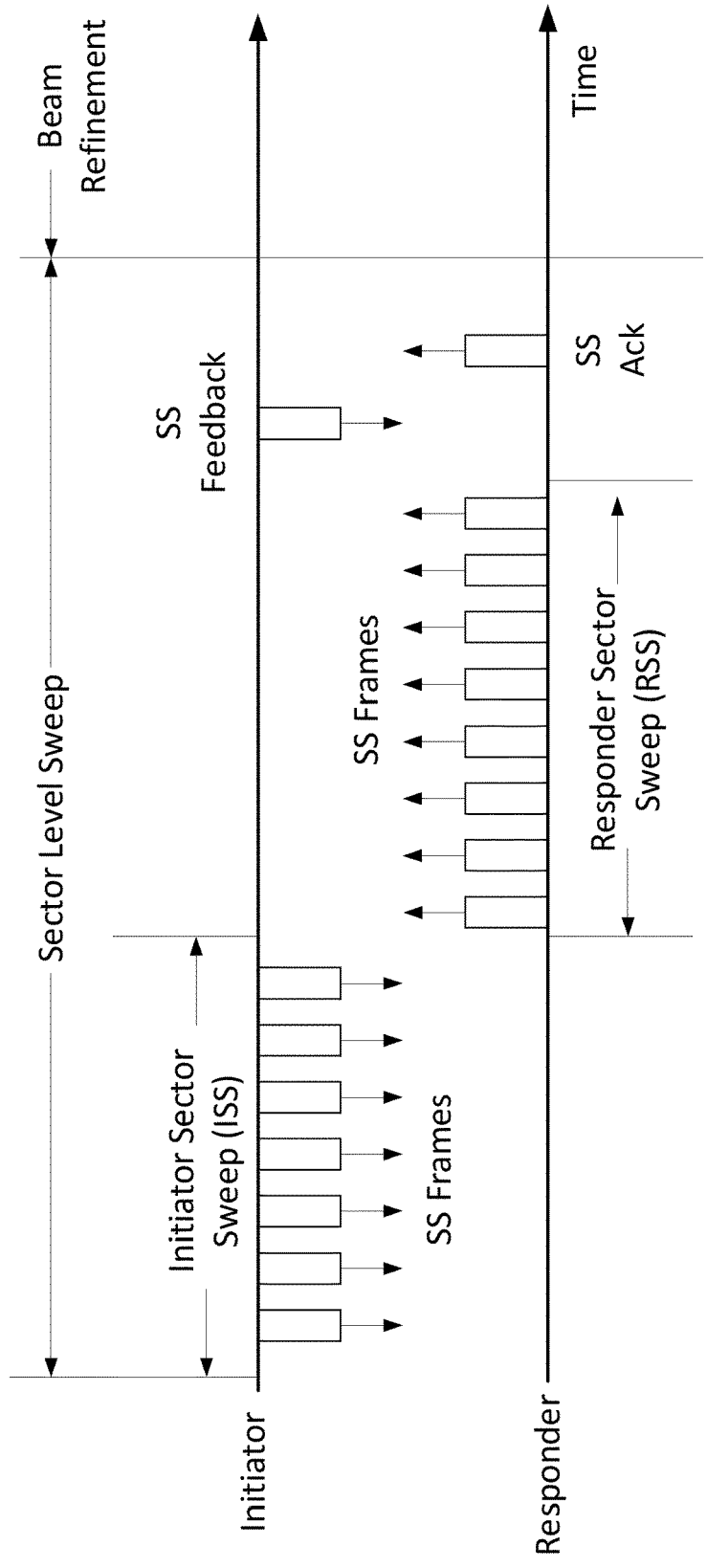
FIG. 3 is an example of sector level sweep training.

FIG. 3 is an example of sector level sweep (SLS) training. Sector level sweep (SLS) training may be performed, for example, using a Beacon frame or a sector sweep (SSW) frame. An AP/PCP may repeat a Beacon frame with multiple beams/sectors within a (e.g., each) Beacon interval (BI). Multiple STAs may perform BF training simultaneously. An AP/PCP may not be able to sweep one or more (e.g., all) sectors/beams within a BI (e.g., due to the size of the Beacon frame). A STA may wait one or more BIs to complete ISS training. Latency may occur. An SSW frame may be utilized (e.g., for point to point BF training). An SSW frame may be transmitted (e.g., using control PHY), for example, using the SSW frame format (e.g., as shown in FIG. 3).

FIG. 4 is an example format for a selection sector sweep (SSW) frame.

FIG. 5 is an example format for an SSW field in an SSW frame.

FIG. 6 is an example of an SSW feedback field in an SSW frame.

An IEEE 802.11ay physical layer (PHY) and an IEEE 802.11ay medium access control (MAC) layer may have at least one mode of operation capable of supporting a maximum throughput of at least 20 gigabits per second (e.g., measured at the MAC data service access point) and may maintain or improve power efficiency (e.g., per station). An IEEE 802.11ay physical layer (PHY) and IEEE 802.11ay medium access control (MAC) layer may have license-exempt bands above 45 GHz that may have backward compatibility and/or may coexist with directional multi-gigabit stations (e.g., legacy stations, which may be defined by IEEE 802.11ad) operating in the same band. 802.11ay may operate in the same band as other (e.g., legacy) standards. There may be backward compatibility and/or coexistence with legacy standards in the same band. 802.11ay may support MIMO transmission (e.g., including SU-MIMO and MU-MIMO) and multi-channel transmission (e.g., including channel bonding and channel aggregation).

MIMO channel access may have one or more rules.

An EDMG STA that supports MU-MIMO and/or SU-MIMO (e.g., as indicated in a Beamforming Capability field of an EDMG Capabilities element) may maintain physical and virtual CS and a backoff procedure (e.g., HCF contention based channel access (EDCA)), for example, to transmit and receive a single stream (e.g., SISO) PPDU that may be used to establish a TXOP (e.g., during which a MIMO transmission may take place).

Clear channel assessment (CCA) may be maintained, for example, when an EDMG STA that may support MU-MIMO and/or SU-MIMO attempts to obtain a TXOP for MIMO transmission. MIMO TX antennas that may be used in a TXOP (e.g., as may be determined by MIMO beamforming protocols) may be observed, for example, when CCA is maintained. A STATE parameter of a PHY-CCA.indication may be, for example, one of two values (e.g., BUSY or IDLE). A parameter value may be BUSY, for example, when assessment of a channel by the PHY determines that a channel on at least one MIMO TX antennas may not be idle. The parameter value may be IDLE, for example, when an assessment of a channel on one or more (e.g., all) MIMO TX antennas by the PHY determines that a channel may be idle.

A MIMO channel that may be idle for an interval of point coordination function (PCF) interframe space (PIFS) may mean, for example, that a STATE parameter of the most recent PHY-CCA.indication primitive that may have sensed one or more (e.g., all) MIMO TX antennas may have been (e.g., was) IDLE for a period of PIFS ending at the start of a transmission. A MIMO channel that may be busy may mean, for example, that a STATE parameter of the most recent PHY-CCA.indication primitive that may have sensed at least one MIMO TX antenna may have been BUSY.

A TXOP may be obtained, for example, based on a physical CS, a virtual CS, and a backoff procedure that may enable SISO transmission (e.g., DCF and HCF contention based channel access (EDCA)). A STA may be permitted to obtain a TXOP, for example, when a channel is clear for SISO transmission (e.g., physical and virtual CS may be clear) and a backoff timer for SISO transmission reaches 0.

A STA may have at least one MSDU pending for transmission for an AC of a permitted TXOP. A STA may (e.g., in this case): (i) transmit a MIMO PPDU (e.g., when MIMO channel is idle for an interval of PIFS immediately preceding the start of the TXOP); (ii) transmit a SISO PPDU (e.g., when MIMO channel is busy during an interval of PIFS (e.g., immediately) preceding the start of the TXOP); or (iii) restart a channel access attempt (e.g., by invoking a backoff procedure (e.g., HCF contention based channel access (EDCA)) as though the medium may be busy as may be indicated by physical or virtual CS and the backoff timer has a value of 0).

A STA may transmit a grant frame, e.g., to prepare a receiver for MIMO reception. An EDMG STA may transmit a Grant frame to a peer EDMG STA, for example, to indicate an intent to transmit a MIMO PPDU to a peer STA, e.g., when the Grant Required field within the peer STA's EDMG Capabilities element is one. A STA may (e.g. otherwise) transmit a Grant frame, when a Grant Required field within the peer STA's EDMG Capabilities element is zero. A value of an Allocation Duration field plus a Duration field of a Grant frame in a transmitted Grant frame may indicate a time offset from a PHY-TXEND.indication primitive of a Grant frame transmission, for example, when an EDMG STA intends to initiate access to a channel, e.g., to transmit to a peer EDMG STA. A TXVECTOR parameter CONTROL_TRAILER may be set to Present and a parameter CT_TYPE may be set to Grant for a transmitted Grant frame. A control trailer may indicate, for example, whether an upcoming transmission may be SU-MIMO or MU-MIMO and a corresponding antenna configuration.

The foregoing procedure may be referred to as a rendezvous point setup for MIMO access.

Responder Sector Sweep (RSS) in A-BFT may be allowed on a secondary channel. In an example, one or more responders may (e.g., at the start of each A-BFT) invoke a random backoff procedure, e.g., to initiate or resume an RSS. A random backoff procedure may begin at the start of an A-BFT, for example, when an initiator or a responder is a non-EDMG STA. A responder may select a backoff count as a random integer drawn from a uniform distribution [0, A-BFT Length), e.g., 0 to A-BFT Length−1, where A-BFT Length is a value of an A-BFT Length field in the last received DMG Beacon.

A random backoff procedure may begin at the start of an A-BFT, for example, when an initiator and a responder is an EDMG STA(s). A responder may select a 2.16 GHz channel (e.g., single 2.16 GHz channel) where an A-BFT is present, for example, based on a value of an A-BFT in a Secondary Channel subfield in the last received DMG Beacon. A (e.g., any) frame transmission between an initiator and a responder during an A-BFT may be performed, for example, using a selected channel. A responder may select a backoff count as a random integer that may be drawn from a uniform distribution 1 [0, A-BFT Length+A-BFT Length×A-BFT Multiplier), e.g., 0 to (A-BFT Length+A-BFT Length×A-BFT Multiplier)−1, where A-BFT Length and A-BFT Multiplier may be values of an A-BFT Length and A-BFT Multiplier fields, respectively, in the last received DMG Beacon.

A responder may decrement a backoff count (e.g., by one) at the end of a (e.g., each) SSW slot, for example, even when a CS function at a responder indicates a medium busy condition for that SSW slot. A responder may initiate an RSS (e.g., only) at the start of an SSW slot for which a backoff count may be 0 at the beginning of the SSW slot.

There may be a bandwidth restriction on BTI and ATI. In an example (e.g., in an EDMG BSS), a BTI and ATI may (e.g., may only) be present on a primary channel of a BSS. An A-BFT may be present on a primary channel of a BSS and may (e.g., may also) be present on a secondary channel of a BSS. Transmissions within a CBAP or an SP may span a primary and a secondary channel. A channel width of a primary channel may be, for example, 2.16 GHz.

Protection from unintended STAs on MIMO antenna/sector may be provided. A mechanism for a transmitter/receiver to identify blocked/interfered MIMO stream may be provided. Transmission may be allowed with a reduced rank. A receiver may protect its reception from interference generated by unintended STAs for its MIMO antennas/sectors.

A receiver may respond, for example, when (e.g., only) a subset of its MIMO antennas/sectors or (e.g., only) its SISO antennas/sectors has CCA status idle before receiving a frame setting up a MIMO transmission (e.g., RTS).

Channel access may be provided for MU-MIMO transmission. A transmitter/AP may set up and/or protect its MU-MIMO transmission. A frame that is used to setup MIMO transmission, such as RTS and CTS-to-self, may not be addressed to multiple STAs. Multiple STA replies to setup may be used to protect their receptions.

Figure 7:
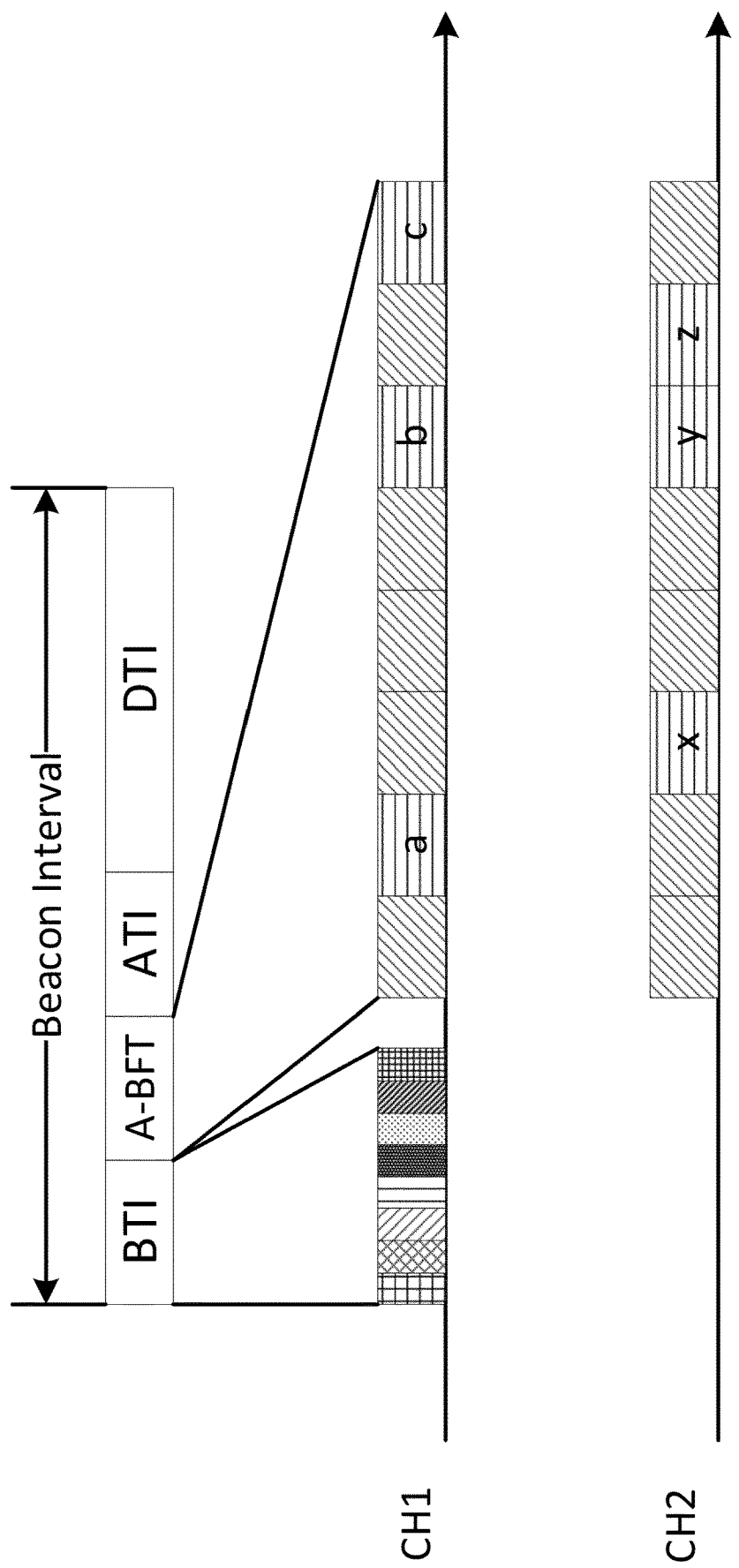
FIG. 7 is an example of STA x, y, z accesses on a secondary channel in Association Beamforming Training (A-BFT).

FIG. 7 is an example of STA x, y, z accesses on a secondary channel in A-BFT.

A STA may perform RSS on a secondary channel. An AP may send an SSW feedback frame on the same channel, for example, when a responder (STA) selects a secondary channel to perform RSS. A channel condition of a secondary channel may be different (e.g., very different) from a primary channel. An SSW feedback AP sent on a secondary channel may not reach a STA, for example, because feedback provided in an SSW transmission (e.g., a short SSW transmission) in A-BFT may have been made on a primary channel reception.

An EDMG header of single carrier (SC) and OFDM PHY may not signal a number of spatial streams (e.g., orthogonal sequences) of a TRN field, which may be different from the number of spatial streams in a data portion. A TX may not sound a channel that may have a number of TX antennas greater than a number of spatial streams supported by an RX (e.g., in a BRP packet), for example, when a number of TRN spatial streams supported by an RX is limited to a supported number of data spatial streams.

Figure 7A:
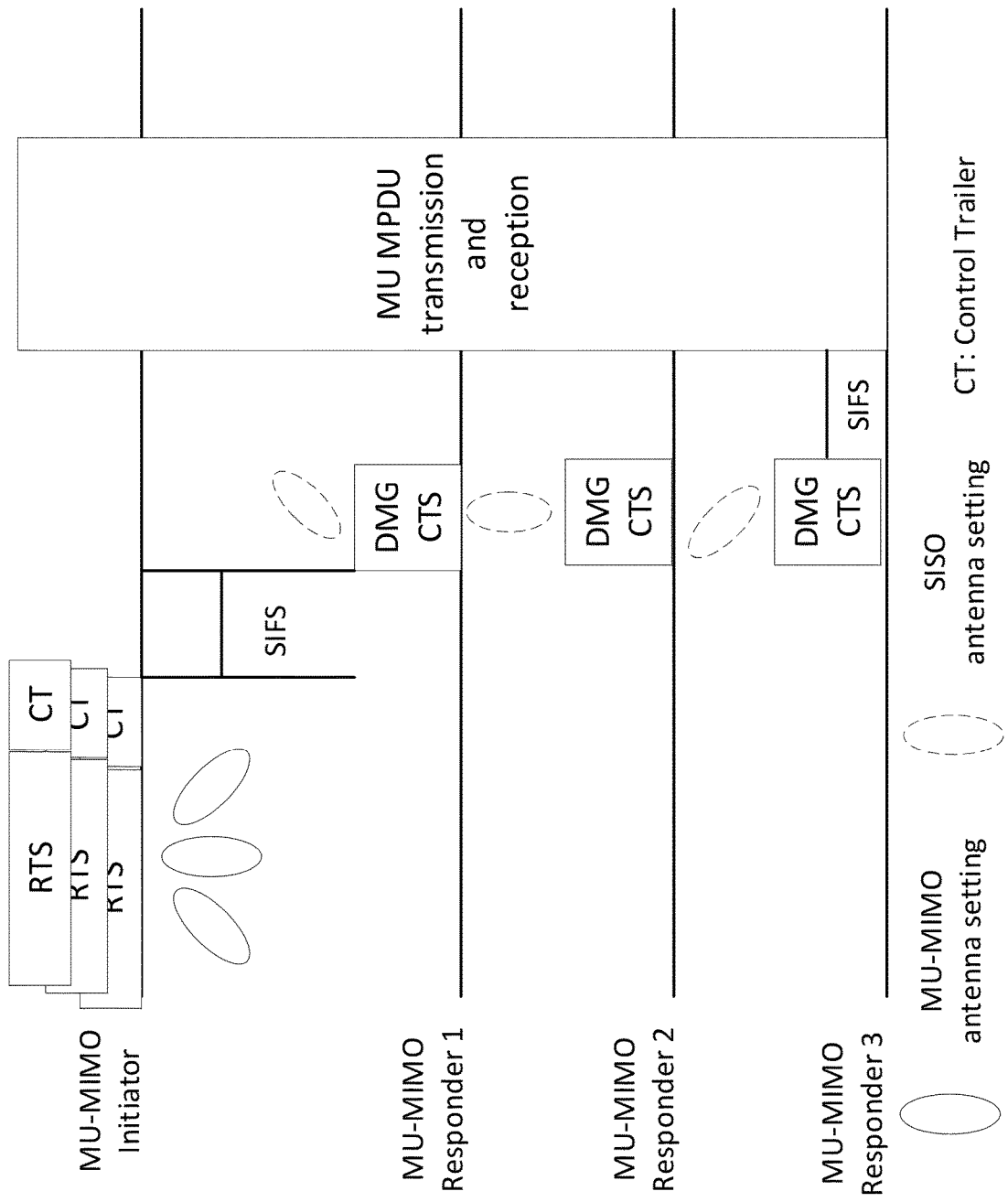
FIG. 7A is an example of MU-MIMO channel access flow.

Receive address (RA) of RTS and Transmit Address (TA) of CTS may be used for MU-PPDU protection. Simultaneous CTS may be used for MU-MIMO channel access as shown for example in FIG. 7A. FIG. 7A shows an example of MU-MIMO channel access flow (e.g., for RTS/DMG CTS).

When using access for the setting of TA/RA in the RTS frame and the NAV setting of group recipients, the setting of the TA/RA of the RTS frame may not cause a legacy STA to respond to an RTS frame used for MU-MIMO. EDMG group ID may be signaled in the control trailer of a RTS or CTS-to-self frame. An identical EDMG group ID may be in use in several neighboring BSSs. The setting of TA/RA may not cause an overlapping BSS (OBSS) STA (e.g., DMG or EDMG) to respond. Appropriate addresses may be selected to avoid legacy STAs or any EDMG STAs not in the intended group to mistakenly identify themselves as an intended receiver.

When using access, the setting of TA and scrambling seed in a DMG CTS frame, the contents of the DMG CTS may be substantially identical to multiple responding STAs (e.g., for simultaneous DMG CTS frames). This may provide protection from third party STAs. The TA and scrambling initialization setting may be substantially identical for multiple responding STAs.

When using access, the intended receiving STA of an RTS in a MU-MIMO access may not set its NAV (e.g., due to the lack of a NAV setting for a STA which finished (e.g., fished early) its MU-MIMO access). The STA may be not addressed in a subsequent MU-MIMO data transmission. The STA may be addressed in a subsequent MU-MIMO data transmission and may complete MU-PPDU acknowledgment. A STA may sense the medium as idle (e.g., because ongoing BARs and/or BAs to/from other STAs may not be omni-directional, such that these directional frames cannot set NAV of the STA). The STA may perform access interfering ongoing BAR and/or BA or data transmission.

AP detection of STA's (e.g., non-responding STA's) may send common DMG CTS that may be used for MU-PPDU protection. An AP may send an MU-MIMO data frame to a STA which did not respond (e.g., because the AP may not know which STA has responded with DMG CTS). The STA may not have rx antenna/AWV configured for receiving MU data and/or may be under interference from other STAs. The AP may send (e.g., send subsequently) a block acknowledgement request (BAR) (e.g., implicit BAR) or reverse direction grant (RDG) to the STA and may wait for a response. Sending BAR or RDG to the STA and waiting for a response may be inefficient, e.g., as it may create unnecessary interference and/or waste power/time resources. Sending BAR or RDG to the STA and waiting for a response may create an idle period in a TXOP.

Polling of an ack may be transmitted at an expected time. For an EDMG STA that is involved in MU-MIMO transmission, the EDMG STA may enter power saving (PS) mode for a time period. The time period may be the from the time of detecting the end of frame (EOF) field in the STA's individual aggregated MAC protocol data unit (A-MPDU) (e.g., it does not need to wait for the padding data transmission), to the time of wake up before its corresponding BAR/BA exchange with the initiator. The time period may be from the time of successfully sending back the block Ack (BA) to the end of the current MU-MIMO transmission.

Figure 7B:
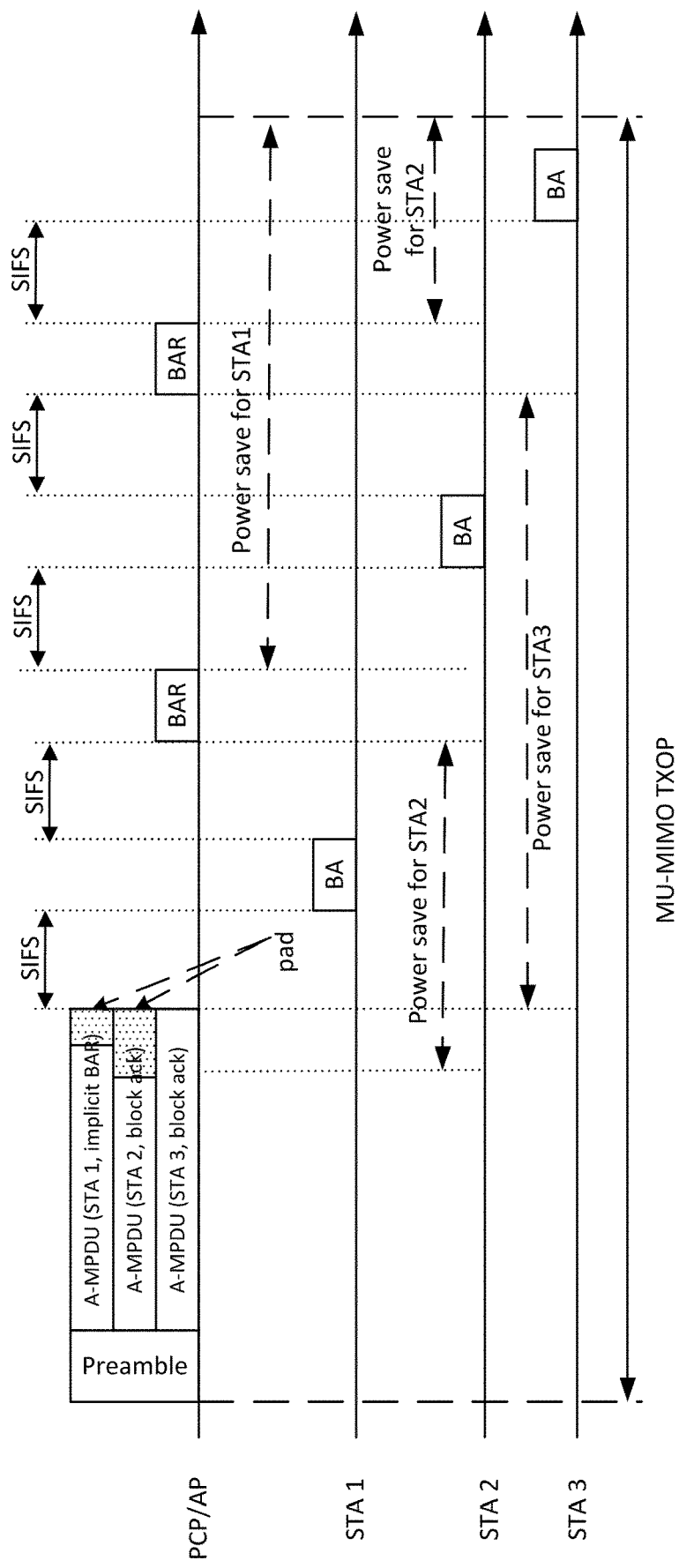
FIG. 7B is an example of MU-MIMO power save.

FIG. 7B illustrates an example MU-MIMO power save. As shown in FIG. 7B, the AP may receive no response from a non-responding STA any may not be able to poll the next STA earlier. The AP may keep the channel busy until the next expected time for BAR. The AP may keep the channel idle in the duration, e.g., before the next BAR transmission time. The idle channel may not be used for CCA of 3rd party STAs (e.g., because OBSS STAs with a different primary channel does not maintain full NAV on this channel and may decide to access after channel idle for PIFS).

Figure 8:
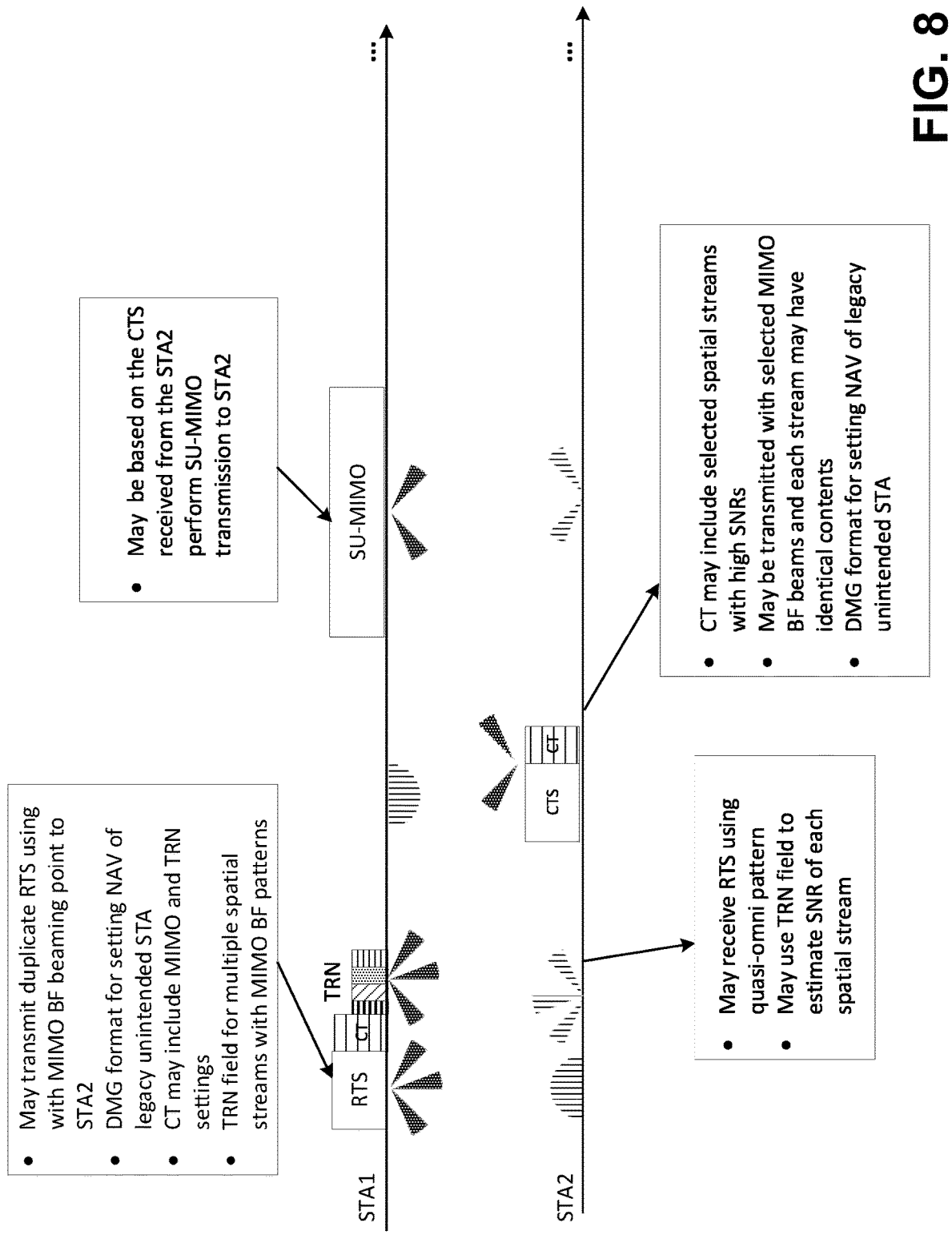
FIG. 8 is an example of duplicate RTS/CTS signaling on a spatial domain for SU-MIMO.

FIG. 8 is an example of duplicate RTS/CTS signaling on a spatial domain for SU-MIMO. One or more of the following may apply. STA2 may (e.g., after a rendezvous point) perform preamble detection on its SISO BF trained antenna/sector and may perform energy detection on MIMO BF trained antennas/sectors. STA1 may follow an access rule (e.g., one or more MIMO channel access rules described herein) and may transmit a duplicate RTS frame with multiple spatial streams, e.g., using a trained MIMO BF pattern pointed to STA2. STA2 may receive an RTS frame and/or control trailer, e.g., using a SISO antenna pattern. BF trained MIMO antennas/sectors may be used by STA2 to receive an TRN field (e.g., an enhanced TRN field), e.g., to perform quality estimation of a (e.g., each) spatial stream or a transmit chain. STA1 may receive a DMG CTS, for example, using a SISO antennas pattern. STA1 may transmit a SU-MIMO frame, for example, based on feedback information that may be included in a DMG CTS trailer.

One or more of the following may apply, e.g., where STA1 may follow an access rule (e.g., one or more MIMO channel access rules described herein) and/or may transmit a duplicate RTS frame with multiple spatial streams, e.g., using a trained MIMO BF pattern pointed to STA2. A MIMO BF pattern may include a SISO BF pattern and/or the directional beam used for SISO transmission may be one of the beams used for MIMO transmission. A data and control trailer portion in a (e.g., each) spatial stream from MIMO antennas/sectors may be similar (e.g., identical), for example to facilitate decoding without an EDMG channel estimation field (CEF). An RTS frame may be transmitted in a PPDU that may be understood by legacy STAs, e.g., so an NAV may be set by unintended STAs. A PPDU may include a control trailer that may indicate MIMO settings. An TRN field (e.g., an enhanced TRN field) may follow a control trailer. A control trailer may include information for configuration of the TRN field. The TRN field (e.g., enhanced TRN field) may have orthogonal TRN sequences for different transmit chain(s) or spatial stream(s).

One or more of the following may apply, e.g., where STA2 may receive an RTS frame and/or control trailer, e.g., using a SISO antenna pattern and/or BF trained MIMO antennas/sectors may be used by STA2 to receive an TRN field (e.g., an enhanced TRN field), e.g., to perform quality estimation of a (e.g., each) spatial stream. STA2 may reply (e.g., only reply) with a DMG CTS, for example, when its NAV indicates idle and/or a backoff timer is not running. STA2 may reply (e.g., only reply) with a DMG CTS, for example, when a CCA indicates idle on its SISO antenna/sector, e.g., prior to the reception of RTS. STA2 may reply (e.g., only reply) with a DMG CTS, for example, when an energy detection indicates idle on its MIMO antenna/sector corresponding to a MIMO setting that may be indicated in the RTS trailer, PIFS, e.g., prior to the reception of RTS. A transmitted DMG CTS may have a control trailer that indicates CCA status of MIMO antennas/sectors for STA2 corresponding to a MIMO setting in an RTS trailer or in a previous Grant frame that may set up a MIMO receiver. A CCA status may indicate (e.g., only indicate) that a SISO antenna/sector is available. A transmitted DMG CTS may have a control trailer that may indicate spatial stream selection (e.g., for STA2 to receive), for example, based on an TRN field (e.g., an enhanced TRN field). A DMG CTS may be transmitted in a PPDU format that may be understood by legacy STAs, e.g., so an NAV may be set by unintended STAs. A DMG CTS may be transmitted in MIMO antennas/sectors corresponding to selected spatial streams or CCA idle MIMO antennas/sectors. STA2 may start performing preamble detection/packet decoding on MIMO BF trained antennas/sectors, for example, after transmission of a DMG CTS.

As described herein, STA1 may receive a DMG CTS using a SISO antennas pattern and/or STA1 may transmit a SU-MIMO frame based on feedback information that may be included in a DMG CTS trailer. A SU-MIMO frame may, e.g., in such a case, be transmitted in a subset of spatial streams/MIMO antennas/sectors that may be used to transmit an RTS frame.

Figure 9:
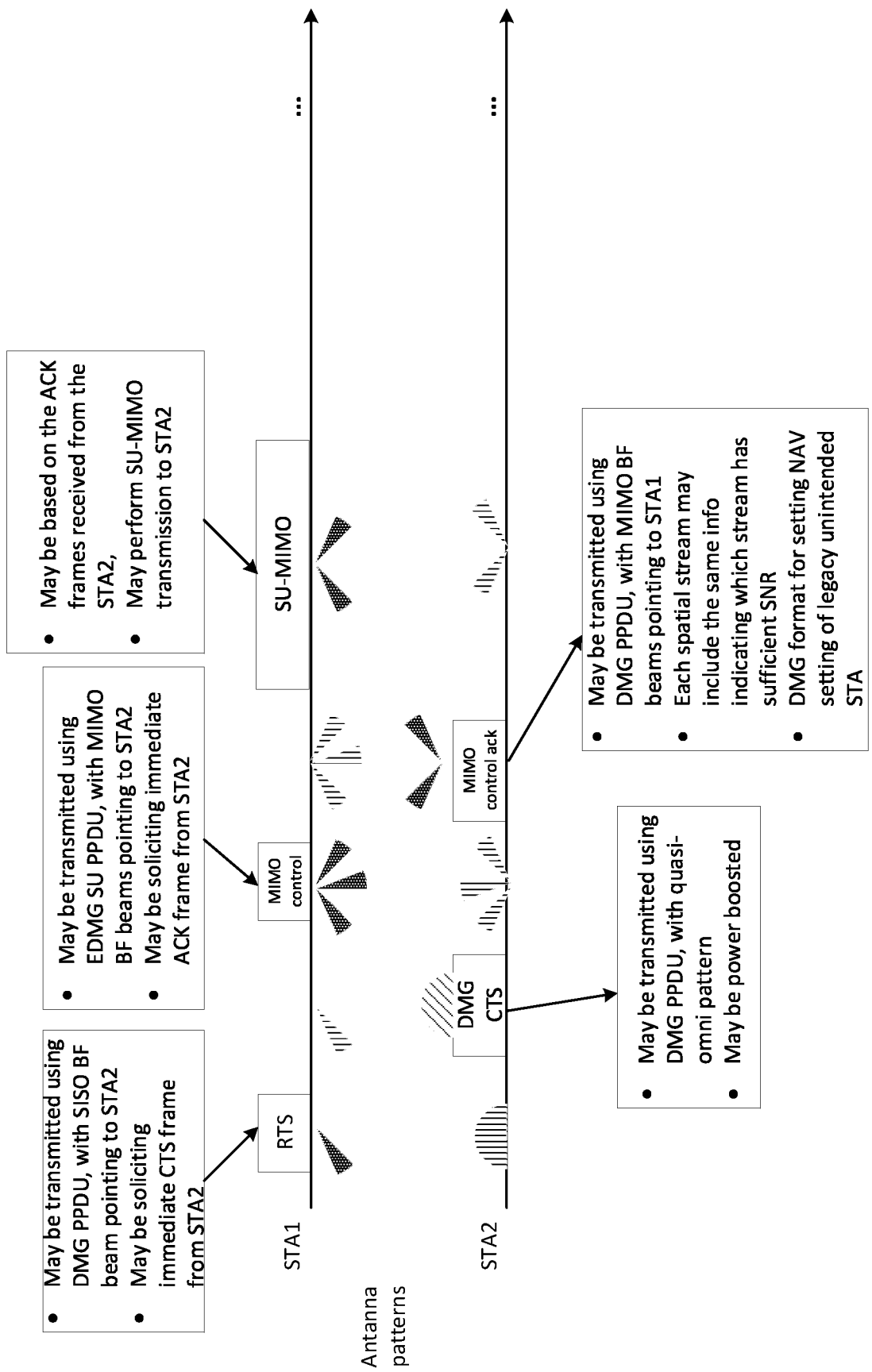
FIG. 9 is an example of SISO and MIMO protection with MIMO rank adaptation at a transmitter.

FIG. 9 is an example of SISO and MIMO protection with MIMO rank adaptation at a transmitter. One or more of the following may apply. STA2 may perform preamble detection on its SISO BF trained antenna/sector and may perform (e.g., at least) energy detection on MIMO BF trained antennas/sectors. STA1 may transmit an RTS frame, for example, with a trained SISO BF pattern pointed to STA2. STA2 may receive an RTS frame, e.g., using a SISO antenna pattern. STA2 may reply with a DMG CTS, for example, using the same antenna pattern. STA1 may receive DMG CTS, for example, using the same antennas pattern that have previously been used to transmit an RTS frame. STA1 may transmit a MIMO control frame on MIMO BF trained antennas/sectors. STA2 may perform preamble detection/packet decoding on MIMO BF trained antennas/sectors. STA2 may reply with a MIMO control ACK frame. STA1 may receive MIMO control feedback from its MIMO BF trained antennas/sectors. STA1 may perform SU-MIMO transmission to STA2, for example, based on information in MIMO control feedback. STA2 may receive a SU-MIMO transmission, e.g., from its MIMO BF trained antennas/sectors.

One or more of the following may apply, e.g., where STA1 transmits an RTS frame with a trained SISO BF pattern pointed to STA2. An RTS frame may be transmitted in a PPDU that is understood by legacy STAs, e.g., so an NAV may be set by unintended STAs. A PPDU may include a control trailer that indicates MIMO settings.

One or more of the following may apply, e.g., where STA2 receives an RTS frame using a SISO antenna pattern. STA2 may reply (e.g., only reply) with a DMG CTS, when its NAV indicates an idle and/or backoff timer is not running. STA2 may reply (e.g., only reply) with a DMG CTS, when CCA indicates idle on its SISO antenna/sector, e.g., prior to reception of RTS. STA2 may reply (e.g., only reply) with a DMG CTS, when energy detection indicates idle on its MIMO antenna/sector corresponding to a MIMO setting that may be indicated in an RTS trailer, PIFS, e.g., prior to reception of RTS. A SISO or quasi omni pattern may cover one or more (e.g., a subset or all) directions that are used for MIMO reception, e.g., based on a MIMO setting that may be indicated in an RTS trailer. A transmitted DMG CTS frame may be power boosted. A transmitted DMG CTS may have a control trailer that indicates a CCA status of MIMO antennas/sectors for STA2 corresponding to a MIMO setting in an RTS trailer. A DMG CTS may be transmitted in a PPDU format that is understood by legacy STAs, e.g., so an NAV may be set by unintended STAs. STA2 may perform (e.g., start performing) preamble detection/packet decoding on MIMO BF trained antennas/sectors, e.g., after transmission of DMG CTS.

One or more of the following may apply, e.g., where STA1 receives DMG CTS using the same antennas pattern that has previously been used to transmit an RTS frame. STA1 may transmit a MIMO control frame on MIMO BF trained antennas/sectors. A MIMO control frame may be in an EDMG SC and/or OFDM PPDU format and/or may include CEF for channel estimation spatial streams. A MIMO control frame may include an NAV setting in its MAC header. A MIMO control frame may solicit a feedback from STA2. A PPDU may transmit a preamble (e.g., at least) in a direction that may cover a direction of an antenna pattern that may be used to transmit an RTS frame. A data portion in a (e.g., each) spatial stream may be identical, for example, so that a decoding failure of one or more streams may not impact other procedure(s).

One or more of the following may apply, e.g., where STA2 performs preamble detection/packet decoding on MIMO BF trained antennas/sectors. STA2 may reply with a MIMO control ACK frame. STA2 may (e.g., based on channel estimation, SNR, or decoding output of a (e.g., each) spatial stream) select a subset of spatial streams to be included as feedback in a MIMO control frame. A MIMO control ACK frame may be transmitted in MIMO antennas/sectors corresponding to selected spatial streams. The selected spatial streams may be a subset of MIMO antennas/sectors corresponding to a MIMO setting in an RTS trailer. STA2 may feedback information on one or more (e.g., all) spatial streams and may rank/order its feedback of a (e.g., each) spatial stream in a MIMO control frame. A MIMO control ACK frame may be transmitted in one or more (e.g., all) MIMO antennas/sectors corresponding to a MIMO setting in an RTS trailer. A MIMO control frame may be transmitted in a PPDU format that may be understood by legacy STAs, e.g., so an NAV may be set by unintended STAs. A data portion in a (e.g., each) spatial stream from selected MIMO antennas/sectors may be identical, e.g., to facilitate decoding without an EDMG CEF.

One or more of the following may apply, where STA1 may receive MIMO control feedback from its MIMO BF trained antennas/sectors. STA1 may perform SU-MIMO transmission to STA2 based on information in MIMO control feedback. An EDMG preamble may include a final MIMO setting.

One or more of the following may apply, where STA2 receives a SU-MIMO transmission, e.g., from its MIMO BF trained antennas/sectors. A receiving MIMO antennas/sectors may be antennas/sectors that have been previously selected in a MIMO control frame. A receiving MIMO antennas/sectors may be one or more (e.g., all) antennas/sectors corresponding to a MIMO setting, e.g., in an RTS trailer. STA2 may switch to a final MIMO antennas/sectors setting based on an EDMG preamble of a SU-MIMO transmission.

Figure 10:
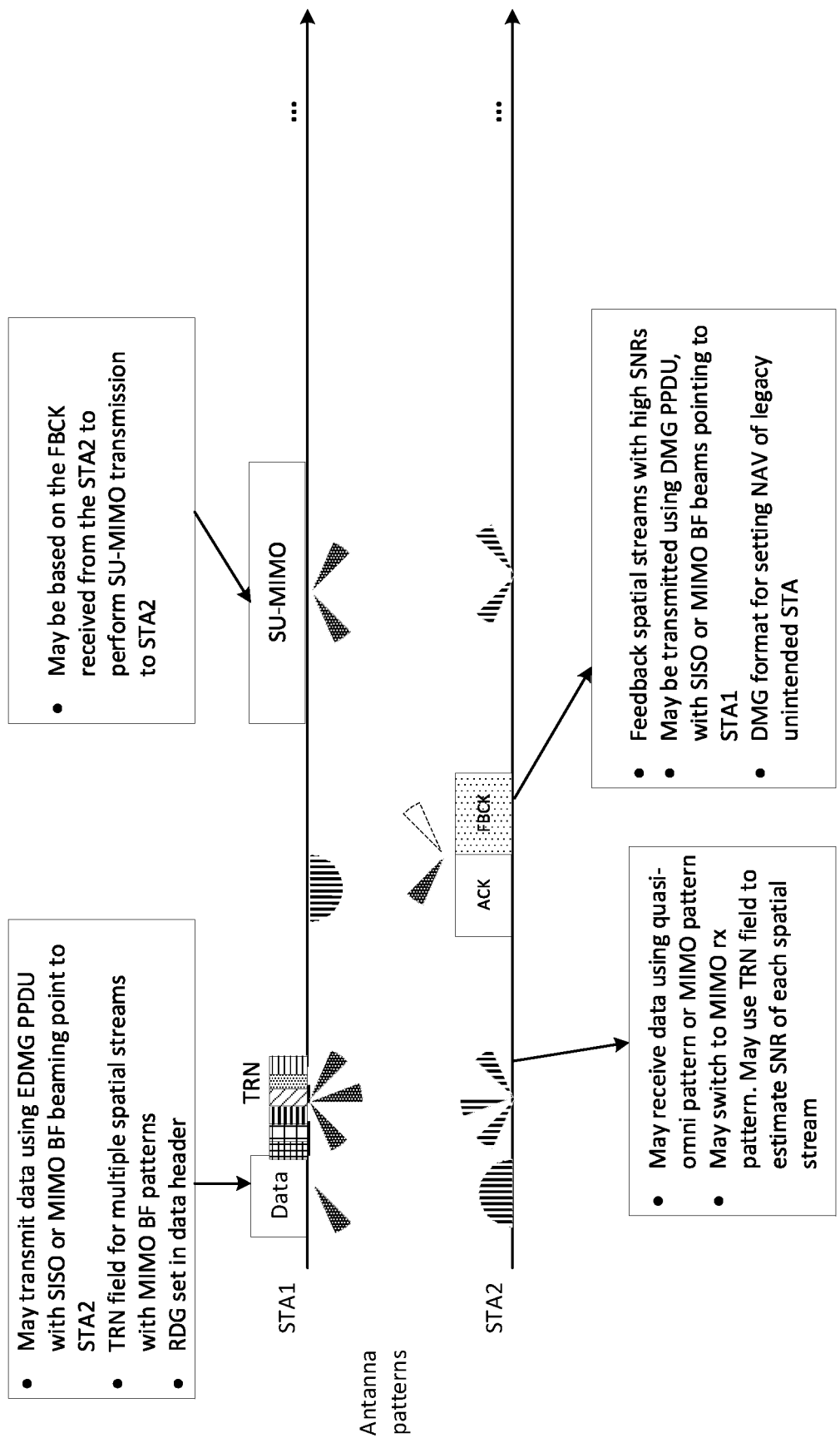
FIG. 10 is an example SISO data transmission soliciting MIMO rank adaptation information.

FIG. 10 is an example SISO data transmission soliciting MIMO rank adaptation information. One or more of the following may apply. STA2 may perform CCA and preamble detection on its SISO BF trained antenna/sector, and may perform (e.g., at least) energy detection on MIMO BF trained antennas/sectors. MIMO BF trained antennas/sectors may be associated with a MIMO configuration ID, such as a TX sector combination index that may be in use (e.g., currently in use). STA1 may perform a CCA on MIMO antenna and/or sectors, e.g., before a data transmission. STA1 may transmit a data frame with a trained SISO or MIMO BF pattern pointed to STA2 (e.g., with a reduced rank). STA2 may receive a data frame, e.g., using a SISO or MIMO antenna and/or sector pattern. STA2 may use MIMO antennas and/or sectors to perform training from a TRN field. STA2 may reply ACK or BA to the data and a feedback frame, for example, based on training performed using the received TRN field. STA1 may receive feedback. STA1 may perform SU-MIMO transmission to STA2, for example, based on information in MIMO control feedback. For example, STA1 may perform SU-MIMO transmission to STA2 based on information in MIMO control feedback with increased, equal, or reduced rank transmission. STA1 may decide (e.g., decide alternatively) to terminate a current TXOP. In examples, STA1 may decide to continue an existing TXOP with MIMO transmissions. STA1 may transmit a NAV setting frame (e.g., backward compatible NAV setting frame) to set NAVs and may transmit the frame in duplicate in a MIMO configuration that is used in the rest of TXOP, e.g., before performing MIMO PPDU transmissions to STA2. STA1 may transmit a frame to STA2 with one or more indications, e.g., regardless whether a MIMO transmission may be used by STA1 to STA2 in a current TXOP. STA2 may receive a transmission (e.g., a SU-MIMO transmission) from its MIMO antennas and/or sectors.

One or more of the following may apply, where STA1 performs a CCA on MIMO antenna and/or sectors, e.g., before a data transmission. A CCA may be performed on antennas, sectors, and/or RF chains that are used for TRN field transmission. A CCA may be performed on antennas, sectors, and/or RF chains that are associated with a MIMO configuration ID, such as a TX sector combination index that may be (e.g., currently) in use.

One or more of the following may apply, where STA1 transmits a data frame with a trained SISO or MIMO BF pattern pointed to STA2 (e.g., with a reduced rank). A data frame may be transmitted in an PPDU, which may include TRN field (e.g., or TRN sequences) for MIMO training. For example, a data frame may be transmitted in an EDMG PPDU that includes TRN for MIMO training. A PPDU (e.g., EDMG PPDU) may include information that indicates TRN settings. A TRN field may be TRN-T or TRN-TX-RX. TRN subfields may be transmitted and/or may be received by MIMO antennas and/or sectors have not been selected or reported in a previous MIMO BF training. A data frame may include a Reverse Direction Grant (RDG). A PPDU may indicate whether the PPDU has a beam tracking request. A frame (e.g., data or EDMG preamble portion of the PPDU) may be sent in duplicate. For example, a frame (e.g., data or EDMG preamble portion of the PPDU) may be sent in duplicate with cyclic shift diversities (CSDs) on one or more MIMO transmit sectors, e.g., as spatial expansion. A frame may be sent (e.g., sent alternatively) with digital beamforming with a number of spatial streams that is less than a total number of transmitting antennas. MIMO antennas and/or sectors may be the same as antennas and/or sectors that are used in part or all of a TRN field transmission. A PPDU may include an indication that a receiver may not change (e.g., should not change) its MIMO RX antennas and/or AWVs (antenna weight vector(s))/sectors, e.g., after feedback.

One or more of the following may apply, where a PPDU includes information that indicates TRN settings. A PPDU may indicate one or more configurations of orthogonal sequences (e.g., a number of sequences). A PPDU may indicate a number of one or more (e.g., all) TRN units/subfields that are mapped to one or more MIMO configuration IDs, such as TX sector combination indices. A setting of the TRN may be signaled, for example, in an EDMG preamble. For example, a setting of the TRN may be signaled in an EDMG preamble in a header, e.g., header-A or header-B.

One or more of the following may apply where a PPDU indicates a number of one or more (e.g., all) TRN units/subfields that are mapped to one or more MIMO configuration IDs, such as TX sector combination indices. In examples, a PPDU may indicate a setting of the TRN that is signaled in an EDMG preamble. For example, a PPDU may indicate a setting of the TRN that is signaled in an EDMG preamble in a header, e.g., header-A or header-B. In examples, information may indicate that one or more (e.g., all) TRN fields that may be used to obtain updated measurement of a MIMO configuration ID (e.g., current MIMO configuration ID in use). A TX or RX may sweep AWV(s) (e.g., similar to current MIMO configuration), for example, to get an updated TX or RX AWV/sector. The updated TX or RX AWV/sector may be used to replace the ones in a current configuration ID. An indication may be implicit. In examples (e.g., additional or alternative examples), a PPDU may indicate a first k TRN units are used for training TX or RX AWV(s) for MIMO configuration ID 1, and/or kx−k+1 to kx TRN units that are used to train TX or RX AWV(s) for MIMO configuration ID x (e.g., where x=1, 2, . . . ). MIMO configuration IDs may be previously reported IDs, such as TX sector combination indices that are reported in a MIMO phase of BF training, or new MIMO configuration IDs. A number k may be a multiple of RX TRN-Units per (e.g., each) TX TRN-Unit that may be signaled (e.g., in EDMG header A).

One or more of the following may apply, where STA2 receives a data frame, e.g., using a SISO or MIMO antenna and/or sector pattern. STA2 may use MIMO antennas and/or sectors to perform training from a TRN field. STA2 may reply ACK or BA to the data and a feedback frame, for example, based on training performed using the received TRN field. An ACK or BA and feedback frame may be aggregated, or may be sent in separate PPDUs, when RDG has been granted by STA1. Feedback may include antenna weight vector (AWV) combinations, rank, SNR information, and/or selected spatial streams. In examples, feedback may include one or more channel measurements (e.g., signal-to-noise ratio (SNR), received signal strength indicator (RSSI), or channel impulse response) that may be associated with one or more TX sector combinations. A combination may be associated with a MIMO configuration ID (e.g., a new MIMO configuration or a TX sector combination index). A combination may be used to replace an existing MIMO configuration ID. A TX sector to RX antenna link with CCA busy at STA2 may be skipped or indicated as such. Feedback may include an indication. An indication may indicate of which MIMO configuration is used or suggested for use, e.g., for the rest of a TXOP. For example, an indication from the feedback may indicate that a TX sector combination is used, e.g., to replace a current MIMO configuration ID. One or more frames from STA2 may be longer (e.g., sufficiently longer) than a regular ACK or BA frame, for example, due to an RDG. A frame may be transmitted, e.g., in a PPDU format that is understood by a legacy STA(s). For example, a frame may be transmitted in a PPDU format that is understood by a legacy STA(s) so that an NAV may be set by unintended STAs. One or more PPDUs that are carrying one or more frames may be transmitted, e.g., using a SISO BF trained antenna and/or sector. PPDU(s) may be transmitted (e.g., transmitted in duplicate) in MIMO antenna and/or sectors that correspond to MIMO configurations that may be selected in feedback. This may provide protection for STA2 to receive MIMO PPDU, e.g., in the rest of TXOP. For example, a MIMO duplicate transmission may be used instead of SISO, for one or more of the following reasons: (i) TX and/or RX AWV may not have changed in feedback or may be a subset of MIMO sectors, e.g., corresponding to a current MIMO configuration; (ii) CCA may be performed, e.g., before reception of transmission for STA1 in (e.g., a subset of) a MIMO configuration indicated idle on MIMO sectors; (iii) signal quality at MIMO antenna and/or sector for STA2 during a TRN field may be better than a threshold; (iv) eliciting PPDU from STA1 may be decoded without errors, e.g., for a threshold number of or for one or more (e.g., all) MAC protocol data units (MPDUs); and/or (v) indications may be included in frame(s), e.g., to indicate whether one or more of the above reasonings are satisfied at STA2. PPDU(s) transmitted from selected MIMO antennas/sectors may be identical (e.g., which may be with a CSD). PPDU(s) transmitted by STA2 may include a TRN field, e.g., with zero energy. The TRN field with zero energy may help STA1 to perform MIMO sector CCA (e.g., based on updated TX sectors) and/or use an updated TX sector to transmit PPDUs (e.g., SIFS after PPDU(s) for STA2). PPDU (s) transmitted by STA2 may include an indication of a MIMO configuration that is used in the reverse direction from STA2 to STA1.

One or more of the following may apply, where STA1 receives feedback. STA1 may perform SU-MIMO transmission to STA2, for example, based on information in MIMO control feedback. For example, STA1 may perform SU-MIMO transmission to STA2 based on information in MIMO control feedback with increased, equal, or reduced rank transmission. STA1 may decide (e.g., decide alternatively) to terminate a current TXOP. In examples, STA1 may decide to continue an existing TXOP with MIMO transmissions based on one or more of the following: (i) STA2 may not have changed its RX AWV/antennas or STA2's AWV may be changed (e.g., to a subset of previous AWVs); (ii) subsequent transmissions for STA1 to STA2 may use TX sector/AWV and antennas that previously had clear CCA; (iii) PPDU for STA2 may be received without error; and/or (iv) STA2 may indicate that its RX MIMO sectors CCA is or have sufficient SNR (e.g., based on TX sectors for STA1 that may be used in subsequent transmissions).

One or more of the following may apply, where STA1 transmits a frame to STA2 with one or more indications, e.g., regardless whether a MIMO transmission may be used by STA1 to STA2 in a current TXOP. An indication may include one or more MIMO configuration IDs that are associated with a TX sector combination report(s) by STA2.

STA2 may receive a transmission (e.g., a SU-MIMO transmission) from its MIMO antennas and/or sectors. For example, STA2 may receive a SU-MIMO transmission from its MIMO antennas and/or sectors, when STA1 decides to continue a current TXOP, e.g., with MIMO transmission(s). Receiving MIMO antennas and/or sectors may be antennas and/or sectors that have been previously selected in feedback.

In examples (e.g., in relation to FIG. 10), because STA1 does not have an opportunity to perform CCA on MIMO sectors for SU-MIMO after tx SISO data, STA1 may use MIMO sectors to transmit a SISO data (e.g., digital BF or spatial expansion), such that MIMO channel around STA1 is occupied by transmission for STA1. This may minimize the chance when later STA1 sends SU-MIMO data that it interrupts a third party STA (e.g., close to STA1 but far from transmission for STA2).

MIMO antenna and/or sector backoff (e.g., for a certain duration after energy detection (ED) indicates busy on a MIMO antenna/sector) may be provided. In examples, CCA of MIMO sector and/or antenna may be performed based on ED. In examples, PPDU received by the MIMO sector and/or antenna may not be decoded.

NAV setting frames (e.g., RTS/CTS) may not be sufficient to set an NAV (e.g., when MIMO CCA is performed by ED) of an unintended STA, when an NAV setting frame has not be received by an unintended SISO antenna and/or sector for STA. A transmission from a SISO sector and/or antenna of an unintended STA may not interfere with ongoing frame exchanges protected by NAV setting frames. An ongoing frame exchange may be interfered with, for example, when an unintended STA accesses a channel using its MIMO antennas and/or sectors. The interference described herein may occur for an unintended STA that may be a non-EDMG/

STA (e.g., enhanced STA). One or more additional procedures may be defined for the STAs described herein.

A STA, e.g., with MIMO reception set up and CCA busy (e.g., by energy detection) on an MIMO antenna(s) and/or sector(s) but not on an SISO antenna(s) and/or sector(s), may defer access, e.g., using MIMO antennas/sectors for a duration T. SISO channel access may not be affected in this duration.

One or more of the following may apply. A duration T may be a TXOP limit, or a duration signaled by an AP or negotiated between an AP and a STA. A timer for duration T may be restarted, when a CCA indicates busy for MIMO antennas and/or sectors CCA while SISO antenna and/or sector CCA indicates idle (e.g., while the timer may be running). A STA may not start a timer for T when a timer for duration T is not running, when CCA indicates busy for MIMO antennas/sectors CCA, and/or when SISO antenna and/or sector CCA indicates BUSY. The STA may decode (e.g., decode instead) a packet from a SISO antenna/sector and/or may set NAV, e.g., using the decoded packet from the SISO antenna/sector (e.g., or STA may combine the signal from multiple antennas for decoding when the STA listens for CCA). A STA may perform (e.g., only perform) access, e.g., using its SISO antennas and/or sectors, when the NAV for STA is clear and/or the timer for duration T is running. A STA may indicate in a frame (e.g., a CTS frame) that its MIMO antennas and/or sectors are for reception (e.g., for reception only), when timer for duration T is running.

MU MIMO channel access and protection may be provided. In an example of an 802.11 mmW system, multiple (e.g., two) channel access allocations may be provided, e.g., service period (SP) and contention based period (CBAP). Allocations may be performed using Extended Schedule Element and/or EDMG Extended Schedule Element, which may be carried (e.g., transmitted) in Beacon Transmission Interval (BTI) or Announcement Transmission Interval (ATI).

Figure 11:
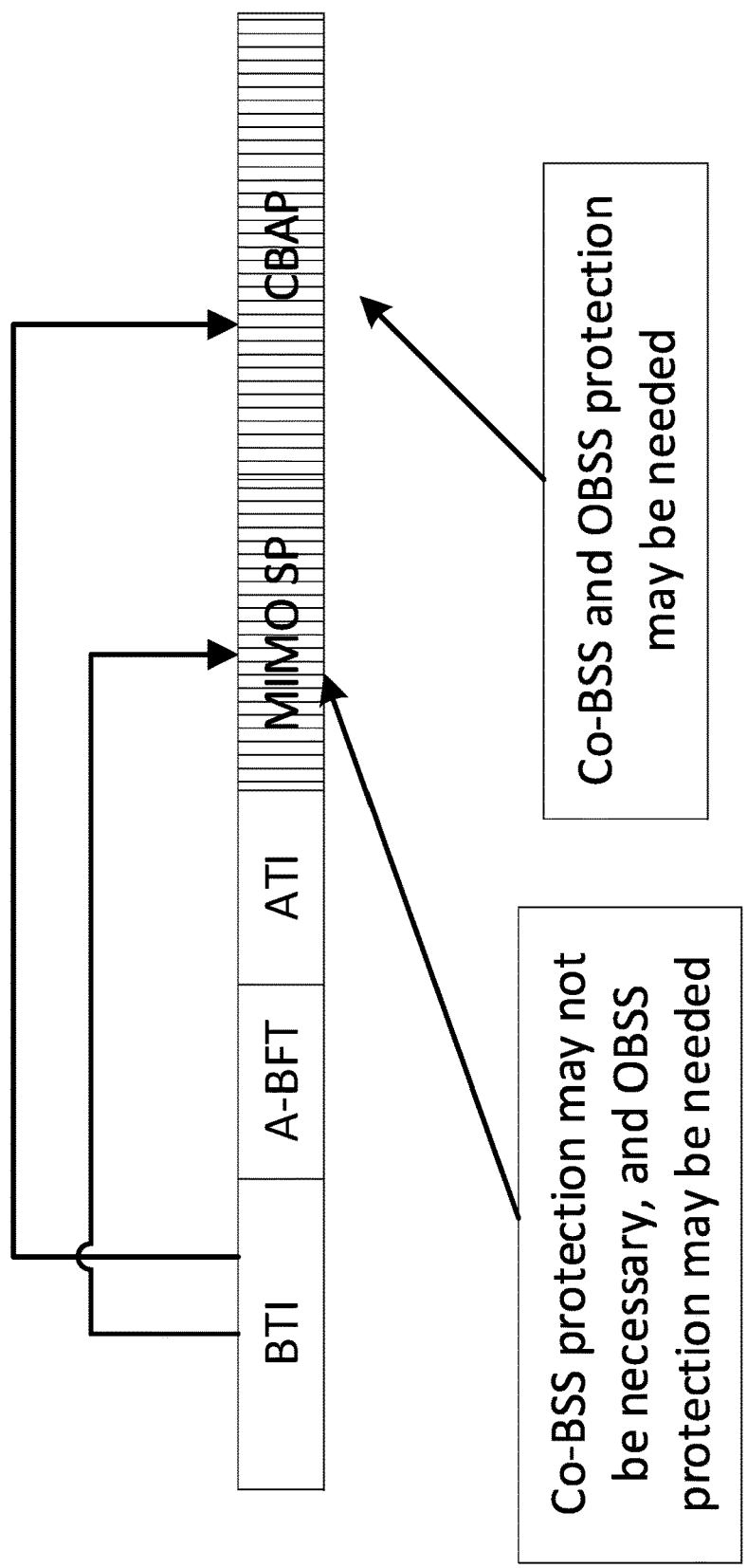
FIG. 11 is an example of service period (SP) and contention based period (CBAP) allocation that may involve a different level of protection.

FIG. 11 is an example of SP and CBAP allocation that may involve a different level of protection. In examples (e.g., for SP), transmissions may be schedule-based and STAs that receive schedule elements may notice transmissions. A protection mechanism may not be necessary within a BSS. Overlapping BSS (OBSS) STAs may not detect schedule elements and may not notice a transmission. Interference may occur, for example, when OBSS STAs transmit or receive during a scheduled SP. In examples (e.g., for CBAP), contention based transmission may be allowed. Protections may be needed for one or more (e.g., all) unintended STAs. In examples, the following information may be carried in the Extended Schedule Element and/or EDMG Extended Schedule Element: (i) a MIMO supported field indicating whether an allocation is used for MIMO transmission; and/or (ii) a MIMO protection field indicating whether an allocation is protected, e.g., by an RTS/CTS like scheme.

One or more procedures described herein may be applied to MU-MIMO and SU-MIMO transmissions.

Figure 12:
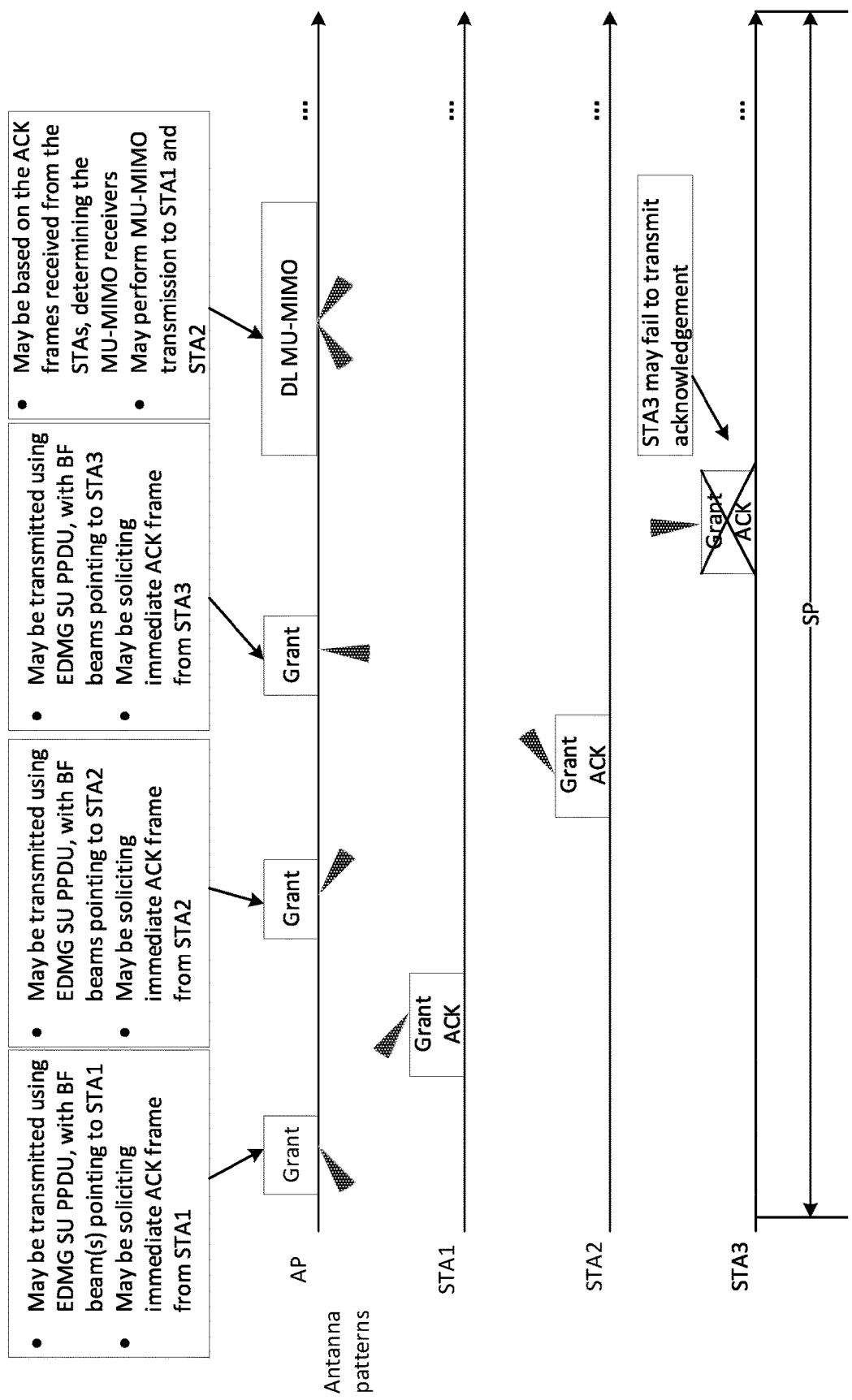
FIG. 12 is an example of a MU-MIMO channel access procedure (e.g., procedure I) in an SP.

FIG. 12 is an example of a MU-MIMO channel access procedure (e.g., procedure I described herein) in an SP. One or more of the following may apply. An AP may allocate a service period (SP) for MU-MIMO transmission, e.g., by an extended schedule element. An extended schedule element may be a legacy and/or enhanced extended schedule element. A source device of an SP may be an AP. Destination devices of an SP may be one or more STAs. An AP (e.g., in an SP) may transmit a Grant frame to a first destination device, e.g., STA1. STAs (e.g., in an SP) may prepare their receive beam(s), by pointing to an AP. In examples, an AP may indicate a MIMO transmission type in an extended schedule element (e.g., MU-MIMO or SU-MIMO). STAs may prepare a corresponding receive beam (e.g., based on an AP indication). In examples, an AP may indicate (e.g., indicate alternatively) beam allocation information in an extended schedule element, and STAs may prepare a received beam, e.g., based on the indication. In examples, an AP may not include beam related information in an extended schedule element, and STAs may use a beam pointing (e.g., a default beam pointing) to the AP.

One or more of the following may apply, where an AP (e.g., in an SP) transmits a Grant frame to a first destination device, e.g., STA1. A Grant frame may be transmitted using an enhanced single user PPDU, or EDMG SU PPDU. A Grant frame may be transmitted (e.g., transmitted alternatively) using a legacy PPDU. An AP may transmit a Grant frame with one or more beams pointing to STA1. For example, the beams used may be the same as beams that are used in a MU-MIMO data transmission. An AP may set an ACK policy to immediate ACK. An AP may indicate what kind of acknowledgement frame is expected (e.g., ACK frame or Grant ACK frame). A duration field in a Grant frame may cover one or more (e.g., all) Grant and/or Grant ACK exchanges, e.g., that occur before MU-MIMO data transmission. A source associate ID (AID) field in a Grant frame may be set to an AID of an AP. A destination AID field in a Grant frame may be set to an AID of STA1. STA1 may detect a Grant frame that may be transmitted from an AP. STA1 may check an RA field of a Grant frame. AID for STA1 may be the same as a destination AID of a Grant frame. STA1 may notice a grant. For example, STA1 may notice the grant, when AID for STA1 is the same of the destination AID of a Grant frame. A start time of an upcoming DL MU-MIMO may be determined, for example, by checking a duration field and/or an allocation duration field in a Grant frame. Unintended STAs that receive a Grant frame may set NAV using the received Grant frame.

STA1 may not sense a transmission during a Short Inter-Frame Space (SIFS) duration of a reception interval of a Grant frame and may not have NAV set. STA1 (e.g., that may not sense a transmission during a SIFS and may not have NAV set) may transmit a Grant ACK frame or an ACK frame back to an AP. Such frame may be transmitted, for example, using a beam pointing to the AP. An AP may continue transmitting a Grant frame to STA2, when a transmission from STA1 is detected (e.g., successfully detected) at the AP side.

An AP may transmit a Grant frame to STA2, for example, when a transmission from STA1 is not detected (e.g., successfully detected) at the AP side (e.g., for xIFS duration of the end of a first Grant frame). An xIFS duration may be a duration covering a Grant ACK or ACK frame expected and SIFS durations used.

The same procedure described herein may be repeated, until an AP transmits Grant frames to one or more (e.g., all) intended STAs.

An AP may become aware or may determine which STA is ready for a MU-MIMO transmission based on a Grant ACK or ACK frames received (e.g., successfully received) by the AP. An AP may not transmit a MU-MIMO PPDU to an STA for STA(s) that fails to reply to a Grant ACK or ACK frame to an AP.

One or more of the following may apply, where STAs (e.g., in an SP) prepares their receive beam(s), by pointing to an AP. In examples, an AP may indicate a MIMO transmission type in an extended schedule element (e.g., MU-MIMO or SU-MIMO). STAs may prepare a corresponding receive beam (e.g., based on an AP indication). In examples, an AP may indicate (e.g., indicate alternatively) beam allocation information in an extended schedule element, and STAs may prepare a received beam, e.g., based on the indication. In examples, an AP may not include beam related information in an extended schedule element, and STAs may use a beam pointing (e.g., a default beam pointing) to the AP. STAs may check an Enhanced Header (e.g., EDMG-Header-A), which indicates a number of spatial streams (Nss) used, when a Grant frame is transmitted using an enhanced PPDU. Corresponding receive beams may be prepared (e.g., based on Nss) for MIMO reception, e.g., starting from an enhanced STF field (e.g., EDMG-STF field).

Figure 13:
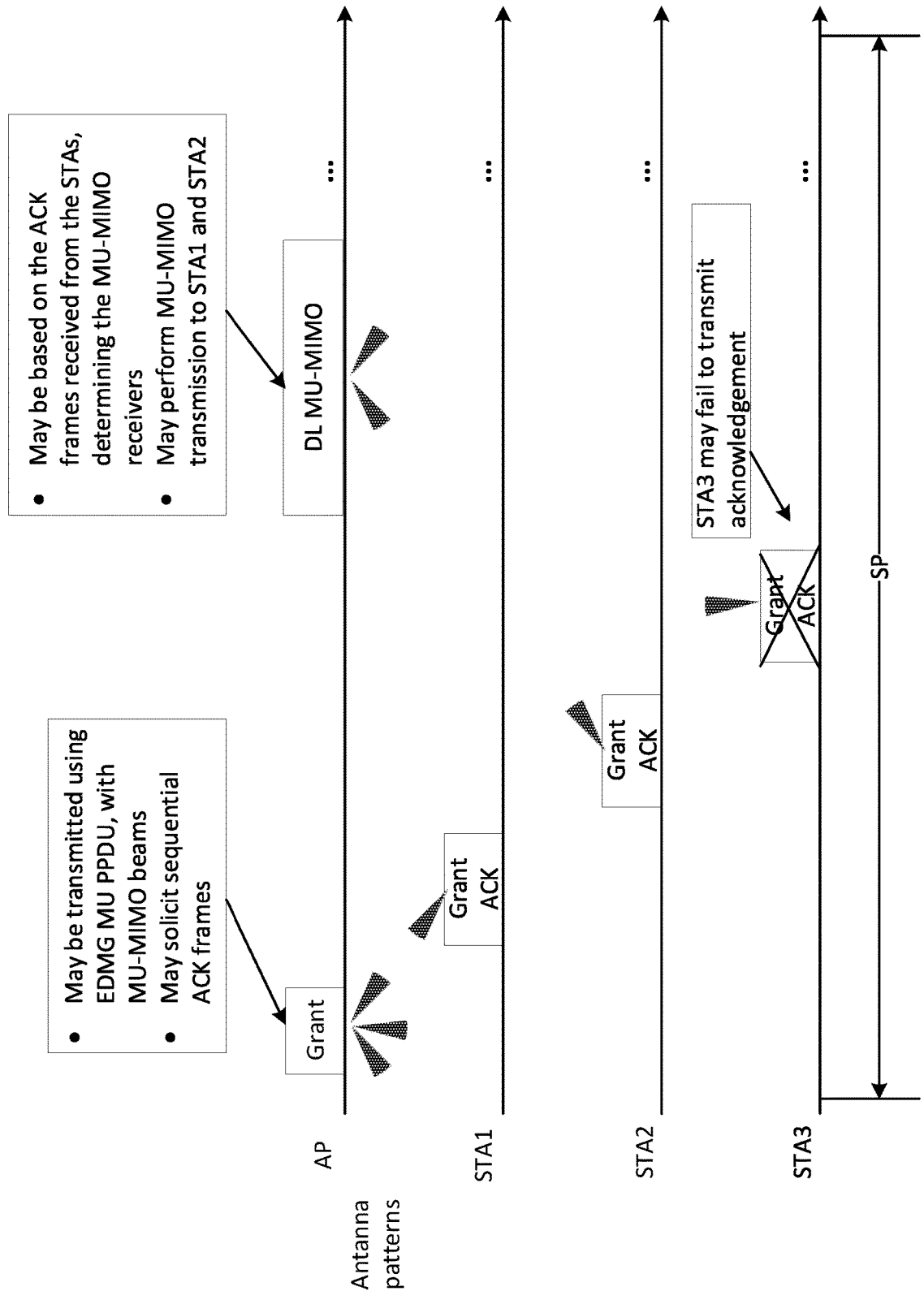
FIG. 13 is an example of a MU-MIMO channel access procedure (e.g., procedure II) in an SP.

FIG. 13 is an example of a MU-MIMO channel access procedure (e.g., procedure II described herein) in an SP. One or more of the following may apply. An AP may allocate an SP for MU-MIMO transmission, e.g., by an extended schedule element (e.g., legacy and/or enhanced extended schedule element). An AP may be a source device of an SP. One or more STAs may be destination devices of an SP. An AP (e.g., in an SP) may transmit a Grant frame to one or more (e.g., all) intended STAs. STAs (e.g., in an SP) may prepare their receive beam(s), for example, by pointing to an AP. In examples, an AP may indicate a MIMO transmission type in an extended schedule element, such as MU-MIMO or SU-MIMO. STAs may prepare a corresponding receive beam based on the indicated MIMO transmission type in the extended schedule element (e.g., MU-MIMO or SU-MIMO). An AP may indicate (e.g., alternatively indicate) beam allocation information in an extended schedule element and STAs may prepare a received beam, e.g., based on the beam allocation information. In examples, an AP may not include beam related information in an extended schedule element. STAs may use a beam pointing (e.g., default beam pointing) to an AP. A Grant frame may be transmitted, for example, using an enhanced PPDU. STAs may check an Enhanced Header (e.g., EDMG-Header-A), which indicates a stream assignment for a (e.g., each) STA AID. An assignment may imply corresponding receive beams. A STA may detect a Grant frame that may be transmitted from an AP. A STA may check AIDs that may be included in a PHY header of a Grant frame. A STA may continue checking a destination AID of a Grant frame, when an AID for STA is indicated in a PHY header. A STA may consider itself to be a potential recipient of a Grant frame, when a destination AID is a broadcast AID or a group AID (e.g., a group AID associated with the STA). A STA may prepare an acknowledge frame that may be expected by an AP. A time to transmit an acknowledgement frame may be indicated (e.g., implicitly indicated) in a PHY Header. An intended STA may notice a grant and a start time of an upcoming DL MU-MIMO that may be determined, for example, by checking a duration field and/or an allocation duration field in a Grant frame. Unintended STAs that receive a Grant frame may set NAV using the received Grant frame. STA1 may not sense a transmission during an SIFS duration of a reception of a Grant frame, and NAV may not be set. STA1 (e.g., that may not sense a transmission during a SIFS and may not have NAV set) may transmit a Grant ACK frame or an ACK frame back to an AP, for example, using a beam pointing to the AP. An acknowledgement transmission may be with polling. An AP may continue transmitting a Grant frame to STA2, when a transmission from STA1 is detected (e.g., detected successfully) at the AP side. An AP may transmit a Grant frame to STA2, when a transmission from STA1 is not be detected at the AP side, e.g., in an xIFS duration of the end of the first Grant frame. An xIFS duration may cover a Grant ACK or ACK frame that is expected and SIFS durations that is used. Intended STAs may transmit acknowledgement frames based on a signaled STA order (e.g., an implicitly signaled STA order), when an acknowledgement transmission is without polling. Intended STAs may be aware of an expected acknowledgement transmission duration for a (e.g., each) STA. Intended STAs may determine a time to transmit their own acknowledgement. An AP may be aware of STAs that are ready for a MU-MIMO transmission, for example, based on a Grant ACK or ACK frames that may be received (e.g., received successfully) by an AP. An AP may not transmit a MU-MIMO PPDU to a STA for STAs that fail to reply (e.g., with a Grant ACK or ACK frame) to the AP.

One or more of the following may apply, where an AP (e.g., in an SP) transmits a Grant frame to one or more (e.g., all) intended STAs. A Grant frame may be transmitted, for example, using an enhanced multi user PPDU or EDMG MU PPDU. An AP may transmit a Grant frame with multiple beams pointing to one or more (e.g., all) intended STAs, e.g., STA1, STA2, and STA3 shown in FIG. 13. For example, beams used may be the same as beams that are used in a MU-MIMO data transmission. An AP may set an ACK policy to immediate sequential ACK with or without polling. An AP may indicate what kind of acknowledgement frame may be expected (e.g., ACK frame or Grant ACK frame). In examples, acknowledgement frames may be transmitted without polling. An order of expected sequential acknowledgement may be indicated (e.g., indicated implicitly) by an AID list order (e.g., SS Descriptor Set fields) that is carried in a PHY Header. An AID for STA may be indicated in a first SS Descriptor Set field in a first STA replying with an acknowledgement frame. An Enhanced header, e.g., an EDMG-Header-A field, may include AIDs of one or more (e.g., all) intended STAs. A duration field in a Grant frame may cover one or more (e.g., all) Grant and Grant ACK exchanges that occur, e.g., before a MU-MIMO data transmission. A source AID field in a Grant frame may be set to an AID of an AP. A destination AID field in a Grant frame may be set to a group AID or a broadcast AID.

Grant frame and Grant ACK frame are used as examples. Other frames, such as an RTS/CTS frame or a modified RTS/CTS frame may be used in examples and embodiments presented herein and/or other examples and implementations. Information mentioned in examples may be carried in the other types of frames.

One or more procedures described herein may be provided for MU-MIMO channel access in CBAP. A MU-MIMO transmission (e.g., in CBAP) may need protection (e.g., extra protection) for co-BSS transmissions. In examples, a protection (e.g., legacy protection) may be applied (e.g., applied first) and may be followed by enhanced protection. A legacy protection may be a legacy transmission of a legacy frame, e.g., so that legacy STAs may be able to understand a transmission. An enhanced protection may be an enhanced transmission that may carry more information that may not be understandable by legacy STAs.

Figure 14:
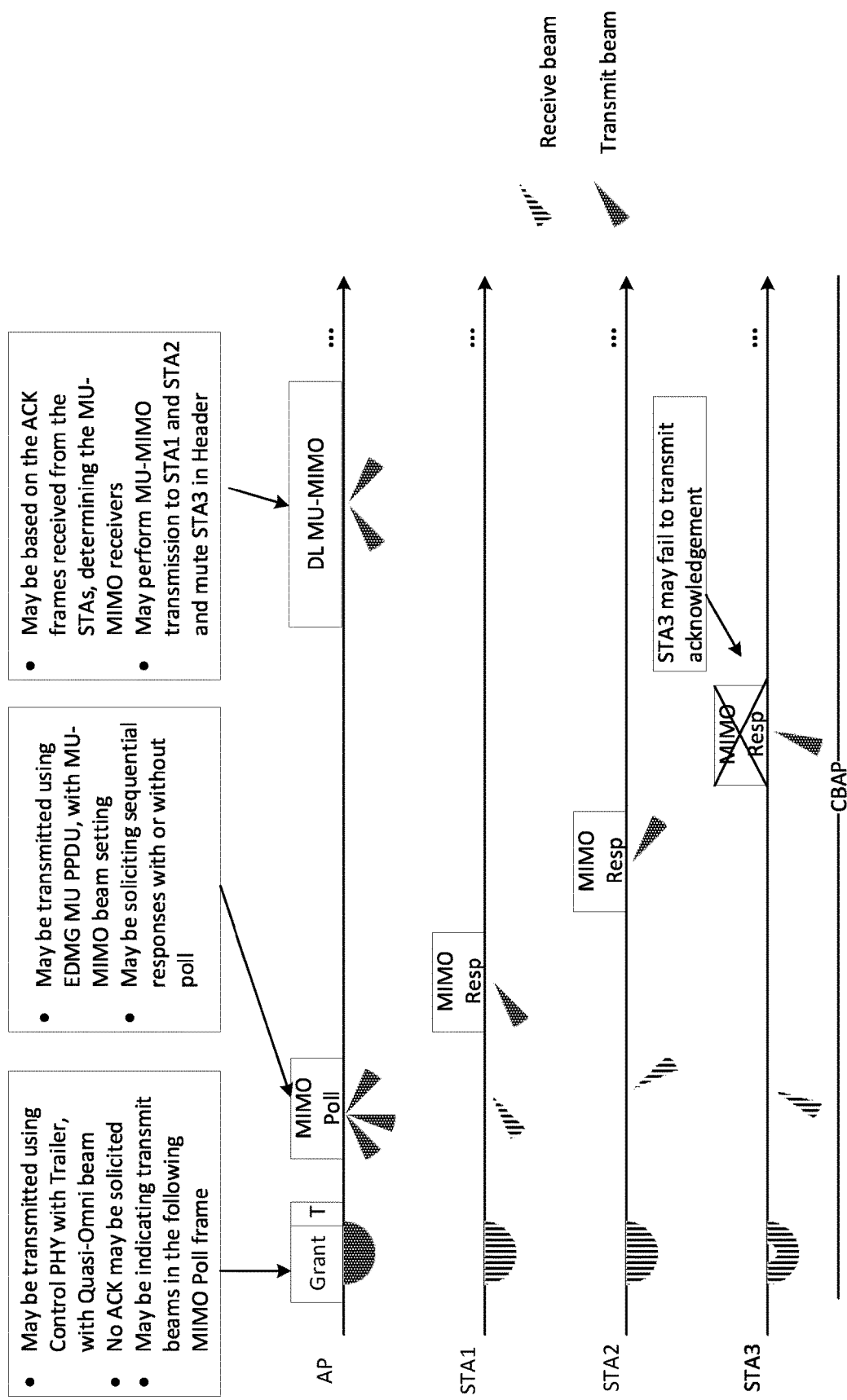
FIG. 14 is an example of a MU-MIMO channel access procedure in a CBAP.

FIG. 14 is an example of a MU-MIMO channel access procedure in a CBAP. One or more of the following may apply. An AP may allocate a CBAP, for example, by an extended schedule element (e.g., legacy and/or enhanced extended schedule element). An AP (e.g., in CBAP) may compete and/or may acquire a medium. There may be an SIFS duration after the Grant frame. STAs may prepare their receive beam(s), for example, by pointing to an AP based on information that is carried (e.g., transmitted) by a control trailer part of a Grant frame. A STA may detect a MIMO Poll frame that is transmitted by an AP. A STA may check AIDs that is included in a PHY header of a MIMO Poll frame. A STA may continue checking a destination AID of a MIMO Poll frame, when the AID for STA is indicated in a PHY header. A STA may consider it to be a potential recipient of the MIMO Poll frame, when a destination AID is a broadcast AID or a group AID. The STA may prepare an acknowledge frame that is expected by an AP. A time to transmit an acknowledgement frame may be indicated (e.g., implicitly indicated) in a PHY Header. An intended STA may notice a start time of an upcoming DL MU-MIMO that is determined, for example, by checking a duration field and/or an allocation duration field in a Grant and/or MIMO Poll frame. An unintended STA(s) that receives a Grant frame and/or MIMO Poll frame may set NAV using the received Grant frame and/or MIMO Poll frame. STA1, e.g., that does not sense a transmission during an SIFS duration after a reception of a Grant frame, and whose NAV is not set, may transmit a MIMO Response frame or an ACK frame back to an AP (e.g., using a beam pointing to an AP). An acknowledgement transmission may be with polling. An AP may continue transmitting a MIMO Poll frame to STA2, when a transmission from STA1 is detected (e.g., detected successfully) at the AP side. An AP may transmit a MIMO Poll frame to STA2, when a transmission from STA1 is not detected at the AP side, e.g., during an xIFS duration of the end of a first MIMO Poll frame. An xIFS duration may cover a MIMO Response or ACK frame that is expected and/or SIFS durations that are used. Intended STAs may transmit acknowledgement frames based on a signaled STA order (e.g., an implicitly signaled STA order), when an acknowledgement transmission is without polling. Intended STAs may be aware of an expected acknowledgement transmission duration for a (e.g., each) STA and may determine a time to transmit their own acknowledgement. An AP may be aware of which STAs are ready for a MU-MIMO transmission, for example, based on a MIMO Response or ACK frames that are received (e.g., successfully received) by the AP. An AP may not transmit a MU-MIMO PPDU to a STA, for example, for STAs that fail to reply to a MIMO Response or ACK frame to an AP.

One or more of the following may apply, where an AP (e.g., in CBAP) competes and/or acquires a medium. An AP may provide an intent to begin a MU-MIMO transmission to multiple STAs. An AP may begin a MU-MIMO transmission to multiple STAs. An AP may transmit a Grant frame. A Grant frame may be transmitted, for example, using a control mode PPDU with a control Trailer. A PPDU (e.g., an entire PPDU) may be configured (e.g., configured to expect) that at least a portion of a trailer is understood by legacy STAs. A trailer (e.g., or portion thereof) may include, for example: (i) a SU/MU-MIMO field that may be set to indicate a following MU-MIMO transmission; and/or (ii) Tx sector IDs, Tx DMG antenna IDs, and Rx DMG antenna IDs for a (e.g., each) spatial stream that may be set, e.g., based on an intended MU-MIMO transmission. An AP may transmit a Grant frame with quasi-omni beams. A duration field in a Grant frame may cover a Grant, a MIMO Poll, and/or MIMO Response exchanges that may occur before MU-MIMO data transmission. A source AID field in a Grant frame may be set, for example, to an AID of an AP. A destination AID field in a Grant frame may be set, for example, to a group AID or a broadcast AID.

One or more of the following may apply, when there is an SIFS duration after the Grant frame. An AP may transmit a MIMO Poll frame. A MIMO Poll frame may be transmitted, for example, using an enhanced MU PPDU. An AP may transmit a MIMO Poll frame with MU-MIMO beams pointing to one or more (e.g., all) intended STAs (e.g., STA1-3). An AP may set an ACK policy to immediate sequential ACK with or without polling. An AP may indicate what kind of acknowledgement frame is expected (e.g., ACK frame or MIMO Response frame). In examples, acknowledgement frames may be transmitted without polling. An order of an expected sequential acknowledgement may be indicated (e.g., implicitly indicated) by an AID list order (e.g., SS Descriptor Set fields) that is carried in a PHY Header. In examples, an AID for STA may be indicated in a first SS Descriptor Set field, e.g., in a first STA reply with an acknowledgement frame. An Enhanced header, e.g., an EDMG-Header-A field, may include AIDs of one or more (e.g., all) intended STAs.

Grant, MIMO Poll, and/or MIMO Response frames are used as examples. Other frames, such as an RTS/CTS frame or a modified RTS/CTS frame, may be used in presented and other examples. Information mentioned in examples may be carried in other types of frames.

MU-MIMO channel access (e.g., described herein) may be implemented using one or more mechanisms (e.g., additional or alternative mechanisms). One or more procedures described herein may use a CTS frame, e.g., in a DMG format. For example, MU-MIMO channel access (e.g., described herein) may be implemented using a CTS frame in a DMG format (e.g., alternatively or in addition to a MIMO Response frame) and/or a CTS-to-self frame (e.g., alternatively or in addition to a MIMO-Poll frame). A CTS frame may refer to a MIMO Response frame, a Grant ACK frame, etc. A Grant frame may refer to a MIMO setup frame or a beamforming configuration frame. In examples, a Grant frame may not be acknowledged. In examples, one or more Grant frames may be aggregated with a CTS-to-self frame with padding (e.g., padding dummy TRN-units) between grant and CTS-to-self frames, e.g., to allow a (e.g., each) STA to switch to the correct configuration.

Figure 15:
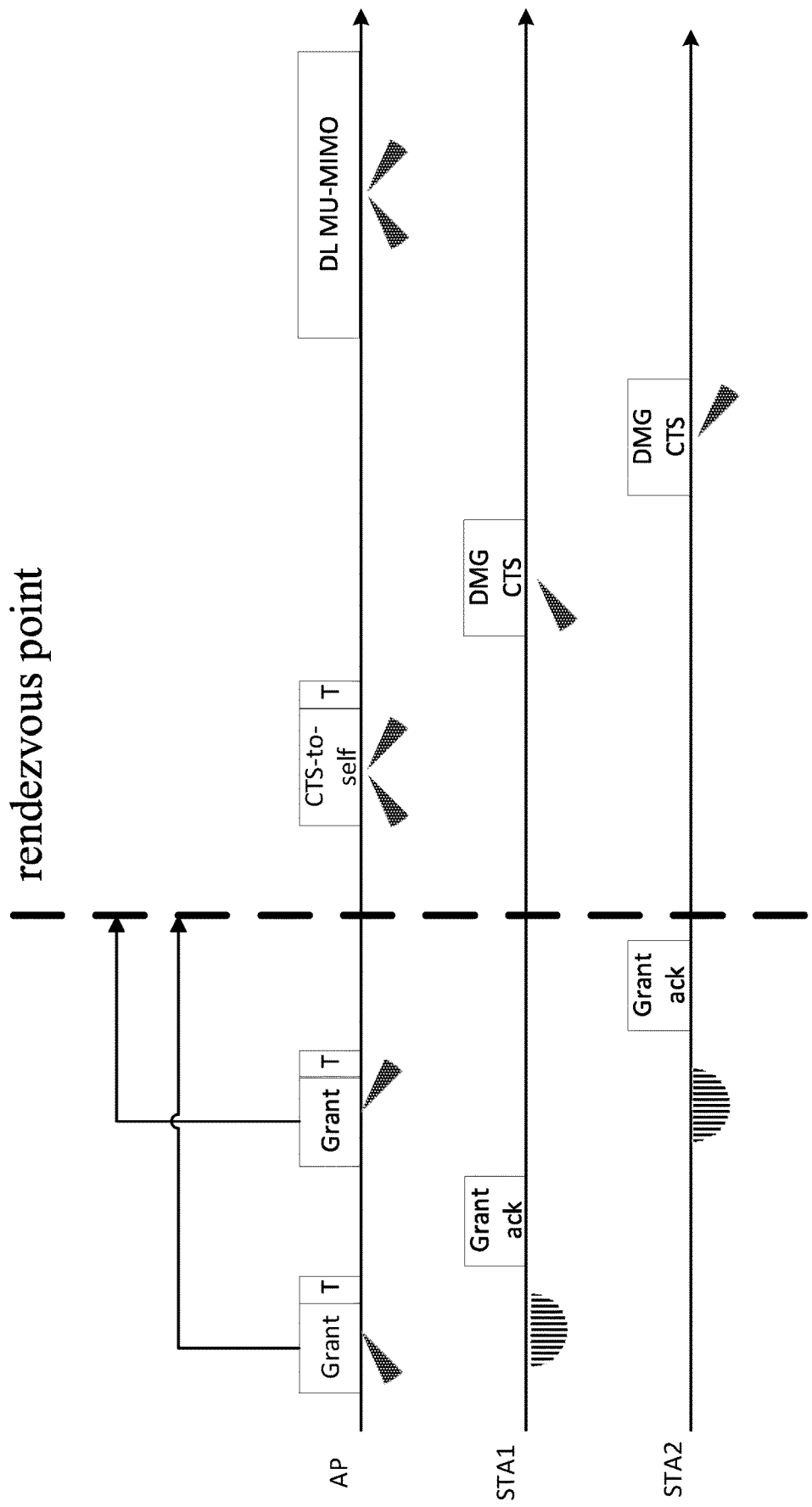
FIG. 15 is an example of a MU-MIMO channel access procedure.

FIG. 15 is an example of a MU-MIMO channel access procedure. One or more of the following may apply. Grant frames may be sent to STA1 and STA2 (e.g., for setting up a rendezvous point where STAs may start MIMO sensing), when a Grant Required field within the EDMG Capabilities element for STA is set to one. A Grant frame may be transmitted, for example, using a PPDU format with a control trailer. A Grant frame may be a unicast transmission to a STA (e.g., single STA), while a transmit beam for the Grant frame points to the STA. An AP may (e.g., after receiving an acknowledgement from a STA) transmit another Grant frame to a second STA and so on. In examples, an acknowledgement may be omitted. In examples, an AP may transmit (e.g., transmit sequentially) Grant frames in the time domain, e.g., to multiple STAs without waiting for Grant Ack. A rendezvous point setup may be signaled (e.g., additionally or alternatively signaled), e.g., via an EDMG extended schedule element, EDMG extended schedule element transmitted in a DMG Beacon, or Announce frame. A Grant frame (e.g., single Grant frame) may be sent (e.g., sent additionally or alternatively) in multiple directions/beams/sectors with identical content. STA1 and STA2 (e.g., in different locations) may receive the same Grant frame in a transmission (e.g., single transmission). STA1 and STA2 (e.g., after a rendezvous point) may switch to RX antenna/sectors settings that are indicated in a control trailer of a Grant frame. A setting may be the same as or a subset of a MU-MIMO configuration that was previously signaled in a MIMO BF selection frame, which was sent by a training initiator (e.g., as part of MU-MIMO BF training). A MU-MIMO antenna/sector configuration may (e.g., additionally or alternatively) be signaled in an EDMG extended schedule element transmitted in a DMG Beacon or Announce frame. In examples, group ID may be included (e.g., in an EDMG extended schedule element). MIMO configuration ID may refer to a SU-MIMO configuration ID, when a SU-MIMO transmission is scheduled. A MIMO configuration ID may refer to MU-MIMO configuration ID, when a MU-MIMO transmission is scheduled. STA1 and STA2 may (e.g., after a rendezvous point) perform a CS (e.g., a full, preamble detection, and/or virtual CS), e.g., based on a reception on a SISO antenna/sector and/or one or more (e.g., all) MIMO antennas/sectors. STA1 and STA2 may perform (e.g., only perform) energy detection on a MIMO antenna/sector, e.g., which may be indicated by a control trailer of a Grant frame. An initiator/AP may send a frame (e.g., CTS-to-self in DMG control mode format) with a control trailer, for example, in MU-MIMO antenna/sectors, e.g., with CSD (cyclic shift diversity). STA1 or STA2 may decide (e.g., decide after receiving a CTS-to-self) whether to reply with a DMG CTS or DMG DTS frame, for example, based on a full Carrier Sensing (CS) status of a SISO sector and/or a MIMO sector before, during, or after the frame (e.g., CTS-to-self frame) sent by the AP. STA1 or STA2 may transmit a DMG CTS (e.g., after having determined to send a DMG CTS) in DMG control mode (e.g., with a control trailer). A MIMO sector may be used to transmit a DMG CTS, when an Antenna Pattern Reciprocity subfield in a DMG STA Capability Information field of a responder and an Antenna Pattern Reciprocity subfield in a DMG STA Capability Information field of an initiator are equal to 1. A reverse direction PPDU may be restricted to be transmitted in a SISO sector, when an RDG is granted to a STA (e.g., one STA) in an MU-MIMO PPDU. A restriction may be implicit, or signaled by an initiator (e.g., in a CTS-to-self control trailer).

One or more of the following may apply, where STA1 and STA2 (e.g., after a rendezvous point) switches to RX antenna/sectors settings that are indicated in a control trailer of a Grant frame. A setting may be the same as or a subset of a MU-MIMO configuration. The setting may be signaled in a MIMO BF selection frame, which is sent by a training initiator (e.g., as part of MU-MIMO BF training). In examples, a control trailer may include a group ID and/or a MU-MIMO configuration ID. In examples, the control trailer may correspond to a set of MIMO antennas/sectors to be used (e.g., in addition to) a SISO RX DMG antenna/sector. The control trailer may be used to monitor a channel after the rendezvous point. A group ID may indicate a group of intended receiving STAs, and a MU-MIMO configuration ID may indicate RX antennas/sectors. A group ID and MU-MIMO configuration IDs (e.g., which may be mapped to RX antenna/sector settings) may be signaled (e.g., previously signaled) in a MIMO BF selection frame (e.g., in previous MU-MIMO BF training). In examples, a control trailer may indicate which antennas or sectors a STA is used to monitor a channel, e.g., which may be in addition to a SISO antenna/sector. A setting may include a TX antenna ID, RX antenna ID, and/or TX sector. A STA may derive (e.g., implicitly derive) an RX sector setting, for example, based on a signaled TX antenna/sector and RX antenna. The derived RX sector of the responder may be used by a responder or recipient, e.g., to transmit a CTS/ACK frame back to an initiator/transmitter.

One or more of the following may apply, where an initiator/AP sends a CTS-to-self (e.g., in DMG control mode format) with a control trailer, for example, in MU-MIMO antenna/sectors, e.g., with CSD (cyclic shift diversity). A direction (e.g., one direction) of the MU-MIMO antenna/sectors may correspond to a SISO sector direction of an intended STA (e.g., one intended STA). In examples, a control trailer (e.g., control trailer of the frame sent by the AP) may include a group ID (e.g., to indicate a group of intended receiving STAs) and/or a set of MU-MIMO configuration ID (e.g., to implicitly indicate which RX antenna(s)/sector(s) may be used to receive a MU-MIMO PPDU). The group ID and/or the set of MU-MIMO configuration IDs, which may be mapped to RX antenna/sector settings, may be signaled (e.g., signaled previously), e.g., in a MIMO BF selection frame (e.g., in a previous MU-MIMO BF training). The group ID and/or the set of MU-MIMO configuration ID may be the same or different from what may have previously been signaled in a Grant frame. In examples, a control trailer may signal one or more AIDs and may indicate which antennas or sectors a STA is used to receive an MU-PPDU, e.g., per individual AID. An antenna/sector setting may include a TX antenna ID, RX antenna ID, and/or TX sector. TX antennas and TX sectors may be used by an initiator and/or AP, e.g., to transmit an MU-PPDU. A responding STA may derive (e.g., implicitly derive) an RX sector setting, for example, based on a signaled TX antenna/sector and RX antenna. A control trailer (e.g., control trailer of the frame sent by the AP) may include an indication to indicate which antenna pattern a responding STA is used to transmit a DMG CTS, so an initiator uses a corresponding antenna pattern to receive the DMG CTS. In examples, one or more of the following may apply: (i) a DMG CTS may be sent using a SISO sector; (ii) a DMG CTS may be sent using MIMO sector(s), or a subset of MIMO sector(s) (e.g., for use by a STA to receive MU-MIMO Data), when a MIMO sector is a superset of a SISO sector; and/or (iii) a duplicate DMG CTS may be sent in SISO and MIMO sector(s), when a MIMO sector is not a superset of a SISO sector. A control trailer (e.g., control trailer of the frame sent by the AP) may include an indication whether a TXOP holder (e.g., initiator) activates a reverse direction grant (RDG). A responding STA may determine (e.g., based on this indication) whether a responding DMG CTS is sent on SISO sectors or MIMO sectors, e.g., for the protection of reverse direction transmission. A control trailer (e.g., control trailer of the frame sent by the AP) may include a field to indicate an antenna configuration ID for an RDG. A control trailer (e.g., control trailer of the frame sent by the AP) may include (e.g., additionally or alternatively include) a field to indicate whether an antenna configuration change at the responder may or may not happen for an RDG.

One or more of the following may apply, where STA1 or STA2 decides (e.g., decides after receiving a CTS-to-self) whether to reply a DMG CTS or DMG DTS frame, for example, based on a full Carrier Sensing (CS) status of a SISO sector or a MIMO sector before, during, or after the frame (e.g., CTS-to-self frame) sent by the AP. A CS (e.g., full CS) may include a status of preamble detection, energy detection, and/or NAV timer. STA1 or STA2 may transmit a DMG CTS, when a sector for SISO CS (e.g., full CS) and one or more (e.g., all) ED for MIMO sectors indicate idle. STA1 or STA2 may transmit a DMG CTS, when a sector for SISO CS (e.g., full CS) and/or a subset of MIMO sector(s) (e.g., which may correspond to RX sector(s) of MU-MIMO stream(s) that may be assigned to a STA in a control trailer of a CTS-to-self) indicates idle. STA1 or STA2 may transmit a DMG CTS, when an ED of MIMO sector(s) (e.g., which may correspond to RX sector(s) of MU-MIMO stream(s)

assigned to a STA in a control trailer of a CTS-to-self) indicates idle. A STA may (e.g., otherwise) not respond or transmit a DTS. A DTS frame may be transmitted, for example, using a SISO sector for STA.

One or more of the following may apply, where STA1 or STA2 transmits a DMG CTS (e.g., after having determined to send a DMG CTS) in DMG control mode (e.g., with a control trailer). STA1 or STA2 may transmit a DMG CTS, for example, using a SISO sector. STA1 or STA2 may transmit a DMG CTS, for example, using MIMO sector(s) whose ED may indicate idle. STA1 or STA2 may transmit a DMG CTS, for example, using MIMO sector(s) whose ED may indicate idle and may correspond to RX sector(s) of MU-MIMO stream(s) that may be assigned to a STA, e.g., in a control trailer of a CTS-to-self. STA1 or STA2 may transmit a duplicate DMG CTS, for example, by transmitting (e.g., transmitting an DMG CTS) using a SISO sector and (e.g., transmitting an DMG CTS) using MIMO sector(s) sequentially or simultaneously. In examples, duplicated DMG CTSs may be sent one after another (e.g., the first using SISO and the second using MIMO sectors). In examples, duplicated DMG CTSs may be sent one after another separated by an IFS (e.g., SIFS). In examples, duplicated DMG CTS (e.g., transmitted using SISO and MIMO sectors) may be sent at approximately the same time with a small delay between them. A DMG CTS (e.g., single DMG CTS) may be transmitted using a MIMO sector, when MIMO sector(s) is a superset of a SISO sector (e.g., when an index of a SISO sector is within indices of MIMO sectors). A control trailer of a DMG CTS may indicate, whether a STA intends to perform SU-MIMO transmission (e.g., when RDG is acquired). A control trailer of a DMG CTS may indicate an availability of RX sector(s) of MU-MIMO stream(s) that is assigned to the STA.

Unintended STAs or third party STAs may perform carrier sensing or energy detection, for example, using SISO or MIMO sectors (e.g., depending on their implementation). One or more STAs may set NAV, when carrier sensing (e.g., full carrier sensing) is performed and/or a valid frame is detected. STAs may defer transmission, when energy is detected.

A Grant frame, e.g., as referred to in one or more examples described herein, may be replaced by other control frames, such as CTS-to-Self, etc.

Management for MU setup may be described herein. A frame used to initiate MU access (e.g., RTS, CTS-to-self, or Grant) may indicate an identity that is used in a responding frame, e.g., so that multiple transmitters may send identical signals in response.

Association Beamforming Training (A-BFT) may be provided on a secondary channel. One or more of the following may apply. An SSW feedback frame may be transmitted, e.g., in both primary and secondary channels. For example, an SSW feedback frame may be transmitted in both primary and secondary channels, when a primary channel is idle and/or when an AP transmits the SSW Feedback frame to a STA that uses a secondary channel for RSS in an A-BFT slot. A STA may select (e.g., select only) a primary channel for A-BFT access, when a number of attempts on secondary channel A-BFT access exceeds a threshold. An AP may perform transmissions in ATI or DTI in duplicate on primary and secondary channels. A STA may transmit in duplicate on primary and secondary channels, when replying to a transmission for AP in ATI or DTI. A transmission may indicate whether the transmission is a duplicated transmission. An AP may use a reception on a primary channel to determine whether a STA performs an TXSS (e.g., an additional TXSS) on the primary channel. For example, an AP may use a reception on a primary channel to determine whether a STA performs an TXSS (e.g., an additional TXSS) on the primary channel when the previous RSS is performed on the secondary channel. A STA may request a TXSS on the secondary channel (e.g., based on reception on a secondary channel) from the AP. A STA, that has experienced a failure of A-BFT access, may wait for a BTI with TRN, e.g., to derive its transmit sector on a primary channel. A STA may use the transmit sector, for example to access AP on the primary channel.

A field (a TRN field), Number of SS in TRN, and/or Number of TRN transmit chains may be included in an EDMG preamble (e.g., Header-A field) of SC or OFDM PPDUs, for example, to indicate the number of streams/ sequences to be transmitted in an appended TRN field. An initiator may indicate a number of SS to be trained or tested, and/or protected (e.g., once the field is set). A responder may determine that the TRN field may be used to carry BF training and/or protection for a number of SS TRN streams/ sequences.

A field (e.g., TRN field) may be applied to one or more procedures (e.g., in one or more examples described herein), to enable channel estimation for rank adaptation. In examples (e.g., for SISO data transmission and soliciting MIMO rank adaptation information), a field may be signaled in a preamble of a SISO PPDU and/or with a transmitter indicating a beamtracking request, so that a receiver may be aware of the number of orthogonal sequences that are used for channel estimation. A value indicated by the field may be greater than a number of spatial streams in a data portion of a beamtracking request PPDU. A receiver may feed back a channel matrix of a higher dimension, for example, to enable a transmitter/beam tracking initiator to evaluate a possibility of sending a MIMO PPDU with a higher rank.

TABLE 1

Example definition for a field:

| Field | Number of bits | Description |
|---|---|---|
| Number of TRN transmit chains | 3 | The value of this field + 1 may indicate a number of transmit chains that may be used in a transmission of a TRN field of a PPDU. This field may be reserved, e.g., when EDMG TRN Length field is 0 or the EDMG Beam Tracking Request field is set to 0. |

A transmitter may transmit (e.g., in the first P TRN subfields in a TRN unit) a number of streams (e.g., orthogonal sequences) that may be the same as a number that may be: (i) indicated in a Number of TRN transmit chains; and/or (ii) indicated in a Number of SS in an EDMG header (e.g., same as number of Data spatial streams).

A transmitter may transmit (e.g., in the last M TRN subfields in a TRN unit) a number of streams (e.g., orthogonal sequences) that may be the same as the number that may be indicated in a Number of TRN transmit chains.

The transition interval between data and TRN field may be a constant interval, e.g., independent of the number of TRN transmit chains.

A STA may have a capability element and/or field to indicate a maximum number of TRN transmit chains (e.g., or number of orthogonal sequences) that the STA may receive, e.g., from a TRN unit. The maximum number of TRN transmit chains that the STA may receive may be restricted to greater than or equal to the number of spatial streams the STA is capable to receive.

The TXVECTOR and RXVECTOR of an EDMG PPDU may have a parameter to indicate a number of TRN transmit chains, e.g., as shown in Table 2.

TABLE 2

Example parameter in an EDMG PPDU

| Parameter | Condition | Value | TXVECTOR | RXVECTOR |
|---|---|---|---|---|
| NUM_TRN_TX_CHAIN | FORMAT may be EDMG and EDMG_TRN_LEN > 0 | The value of this field or the value of this field + 1 may indicate the number of transmit chains used in the transmission of the TRN field of the PPDU. | Y | Y |

A channel measurement with a BRP packet (e.g., single BRP packet) may be supported, when a number of TX antennas is greater than maximum number of TRN spatial streams (e.g., orthogonal sequences) that may be supported by a receiver. A receiver may support (e.g., always support) processing TRN with a maximum number of TRN transmit chains that may be equal to the largest number of TX antennas (e.g., 8 in 802.11ay). A transmitter may segment a TRN field into sections of k TRN units, when the receiver is not able to support simultaneously receiving the maximum number of TRN sequences. In examples, a (e.g., each) k units may transmit TRN (e.g., only transmit TRN) from a subset of TX antennas.

Figure 16:
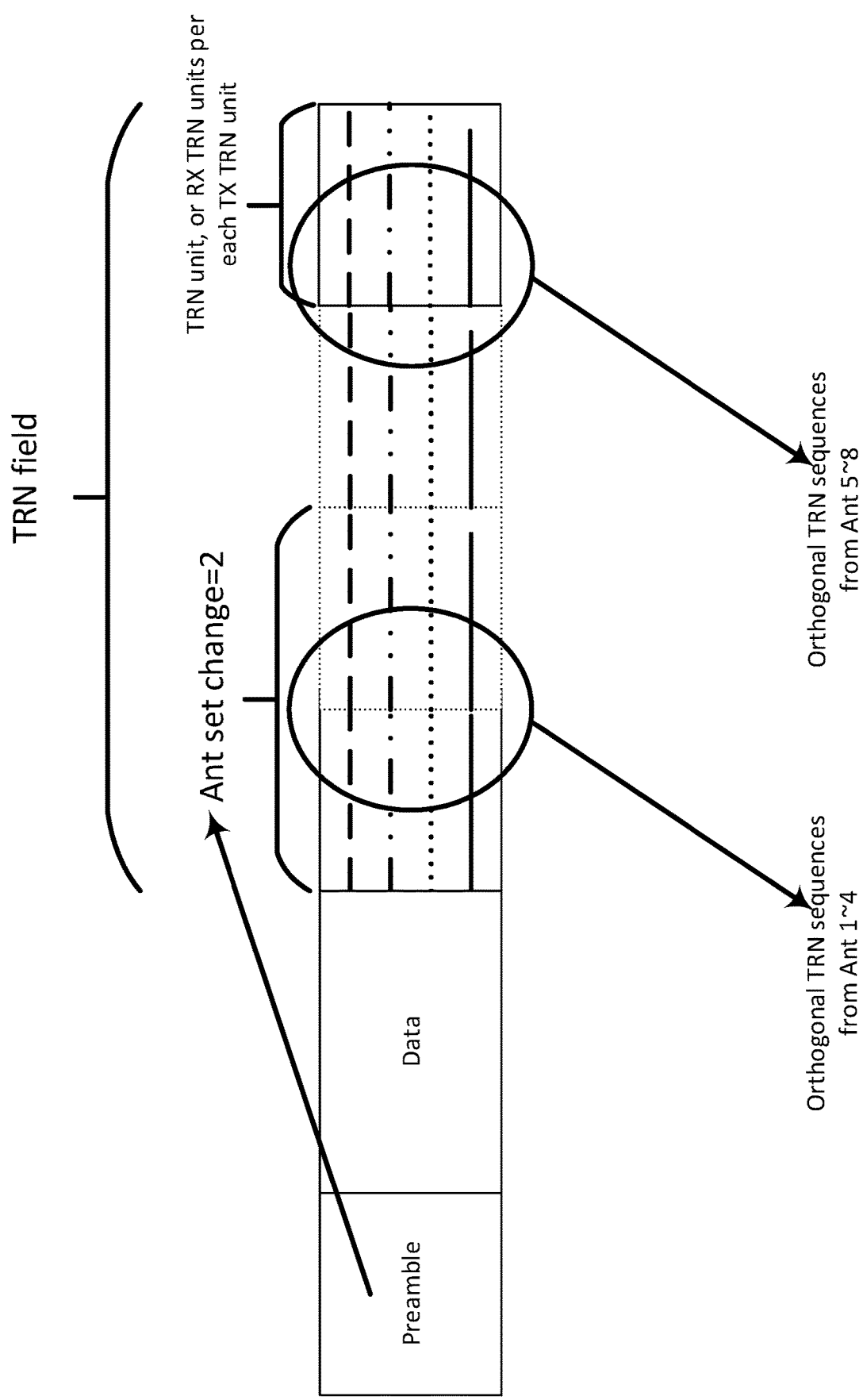
FIG. 16 is example of a transmitter segmenting a training (TRN) field.

FIG. 16 is an example of a transmitter segmenting a TRN field. One or more of the following may apply. A number of subset TX antennas may not be greater than a maximum number of TRN transmit chains that are processed by a receiver. A value of k may be an integer multiple of "RX TRN-Units per Each TX TRN-Unit" (e.g., for a BRP-RX/TX packet). There may be one or more TRN units between 2 k-unit segments (e.g., for a transmitter to switch the set of transmit antennas from a segment to next). A P portion of the k units may not be processed by a receiver. The P portion of the k units may use different AWVs and/or transmit chains as in data portion. A value of k (e.g., in units of TRN unit or "RX TRN-Units per Each TX TRN-Unit" TRN units or other units) may be signaled in an EDMG header (e.g., EDMG header-A). A receiver may combine measurements from different sections to form a TX sector combination (e.g., a complete TX sector combination), when a receiver reports a TX sector combination.

A Number of Measurements subfield of FBCK-TYPE field may be at least the minimum of {16, N-TRN-SB}. N-TRN-SB may be equal to $$N - \text{chain} \times N - pkt \times \frac{N - TRN \times TRN - M}{TRN - N}.$$

$N - TRN, TRN - M,$ and TRN-N may be the values of the EMDG-TRN-LEN, EDMG-TRN-M, and EDMG-TRN-N respectively in the received BRP-TX packet. The Number of Measurements subfield of FBCK-TYPE field may be at least the minimum of {16, N-TRN-SB} when a STA responds to a soliciting BRP frame, which may request a prior TXSS sector list (e.g., TXSS-FBCK-REQ field from the soliciting frame set to 1) and when the feedback is for a TXSS performed in BRP-TX packet. N-chain may be the number of TRN transmit chains in a (e.g., each of) BRP TXSS packet (e.g., in either control or SC/OFDM mode). N-pkt may be the number of BRP TXSS packets previously sent from the soliciting STA or 1.

MAC address settings may use a group bit and/or a group ID.

RTS and simultaneous CTS exchanges may be used (e.g., to protect the transmission and reception of MU PPDU). The RA address of the RTS may be set to a broadcast address, a multicast address, a group address, or the MAC address of one of the STAs for which the RTS has been sent.

A group or individual bit of the MAC address in the RA field of the RTS may be used, e.g., to indicate that receiving STAs may search the control trailer of the RTS to look for their IDs, such as a MAC address, AIDs, and other types of IDs (e.g., to determine whether they are the recipient of the RTS frame).

The MAC address in the RA field in the RTS may be the group address assigned by the transmitting STAs of the CTS for one or more (e.g., all) STAs that the RTS is targeting. The targeted STAs may scan through the control trailer (e.g., when the targeted STAs receives the RTS). The STAs may respond with a simultaneous CTS (e.g., if their IDs are included in the control trailer of the RTS), in which they may set the TA field to the same MAC address included in the RA field of the received RTS.

The RA field of the RTS may be set to the MAC address of one of the STAs that the RTS is targeting. An indication may be included in the RTS to indicate that the RTS is meant for multiple STAs. For example, a group or individual bit in the RA field or TA field in the RTS may be used. The indication may imply to receiving STAs to scan additional fields, such as the control trailer. The targeted STAs, (e.g., after receiving the RTS), may respond with simultaneous CTS or with the TA field set to the same MAC address included in the RA field of the RTS.

A group address to the group of STAs targeted by the RTS may be pre-determined, such as during the training period or through group management procedures. The RA field of the RTS may be set to the group address. The same group address may be used by the responding STAs in the responding CTS.

STAs of the same group may derive a MAC address (e.g., a common MAC address using a least common multiplier).

The AP may send an AID in the RA that may be a function of the AIDs of the STAs in the group. The function of the AIDs described herein may be used as examples. Other functions may be used.

$RA = f1(AID1, AID2, \ldots, AIDn)$ $f2(AIDi) = f3(RA)$

In examples, $AID1 = \{1\ 2\ 3\ 4\ 5\ 6\}$ $AID2 = \{7\ 8\ 9\ 10\ 11\ 12\}$ $AID3 = \{13\ 14\ 15\ 16\ 17\ 18\}$ The receive address may be set to the first two elements of each AID as:

$RA = \{1\ 2\ 7\ 8\ 13\ 14\}$

STA1 correlating with RA may see {1 2}, and STA2 correlating with RA may see {7 8}, while STA3 correlating with RA may see {13 14}.

The AID in the RA may be set to the group ID of the STAs. The STAs may combine the TA and the RA (e.g., to ensure that the information is meant for them and not for a group in an OBSS with a similar group ID/derived RA).

A MAC frame for MU-RTS may be described.

An AP may transmit a defined EDMG MU-RTS frame that may request concurrent CTS for MU-MIMO channel access.

The EDMG MU-RTS frame may be transmitted, e.g., using a DMG PPDU format, such that legacy STAs may read the duration field and set their NAV correspondingly. The CTS frames, that may be requested by the EDMG MU-RTS frame, may be the DMG CTS frame and may be transmitted using DMG PPDU, e.g., to protect legacy transmissions.

The EDMG MU-RTS may be a variation of a trigger frame. The trigger type field in a Common Info field defined in a trigger frame may have a value (e.g., new value) to indicate an EDMG MU-RTS. For example:

| Trigger Type field value | Description |
|---|---|
| 8 | EDMG MU-RTS |

The following information may be included in the Trigger frame EDMG MU-RTS variation (e.g., either in the common info field or the user dependent info field): (i) channel bandwidth related information (e.g., channel aggregation/bonding and/or bandwidth); (ii) SU/MU-MIMO indication; (iii) Group ID/Group ID mask (e.g., the Group ID may indicate a group of user, and Group ID mask may indicate the selected user for the following MU-MIMO transmission from one or more (e.g., all) of the users in the Group); and/or (iv) antenna setting (e.g., per user per stream analog antenna setting: including the Tx antenna ID, TX sector/AWV ID, RX antenna ID RX sector/AWV ID, etc).

The EDMG MU-RTS may be a defined control frame, which may carry the above mentioned information. The duration field may set to cover the transmission of following CTS frames, the MU-MIMO transmissions, and/or acknowledgements. The RA field may be set to a broadcast or multicast MAC address. The EDMG MU-RTS field may carry user specific information fields. The STA AID may be used to identify the STA (e.g., in each user specific information field). Group ID/Group ID mask may be used (e.g., used alternatively or in addition) to identify the STA.

Energy detection of common CTS based on MU-MIMO beam directions may be used.

A (e.g., each) STA may be assigned (e.g., assigned in a mmWave multi-user transmission) to a specific beam, AWV, or beam pair link, e.g., after the MIMO phase of the MU-MIMO beamforming protocol.

An EDMG PCP-AP may perform (e.g., perform independently) energy detection of a (e.g., each) receive beam, beam pair, or AWV of the MU-MIMO transmission. For example, An EDMG PCP-AP may perform energy detection to identify the specific STAs that reply during a common CTS transmission.

The EDMG PCP-AP may (e.g., on successfully decoding the common CTS) identify the STAs that sent the CTS by identifying the receive beams, beam pairs, and/or AWVs with energy levels that exceed a threshold and mapping the receive beams, beam pairs, and/or AWVs to the corresponding STAs in the MU-MIMO group.

Figure 17:
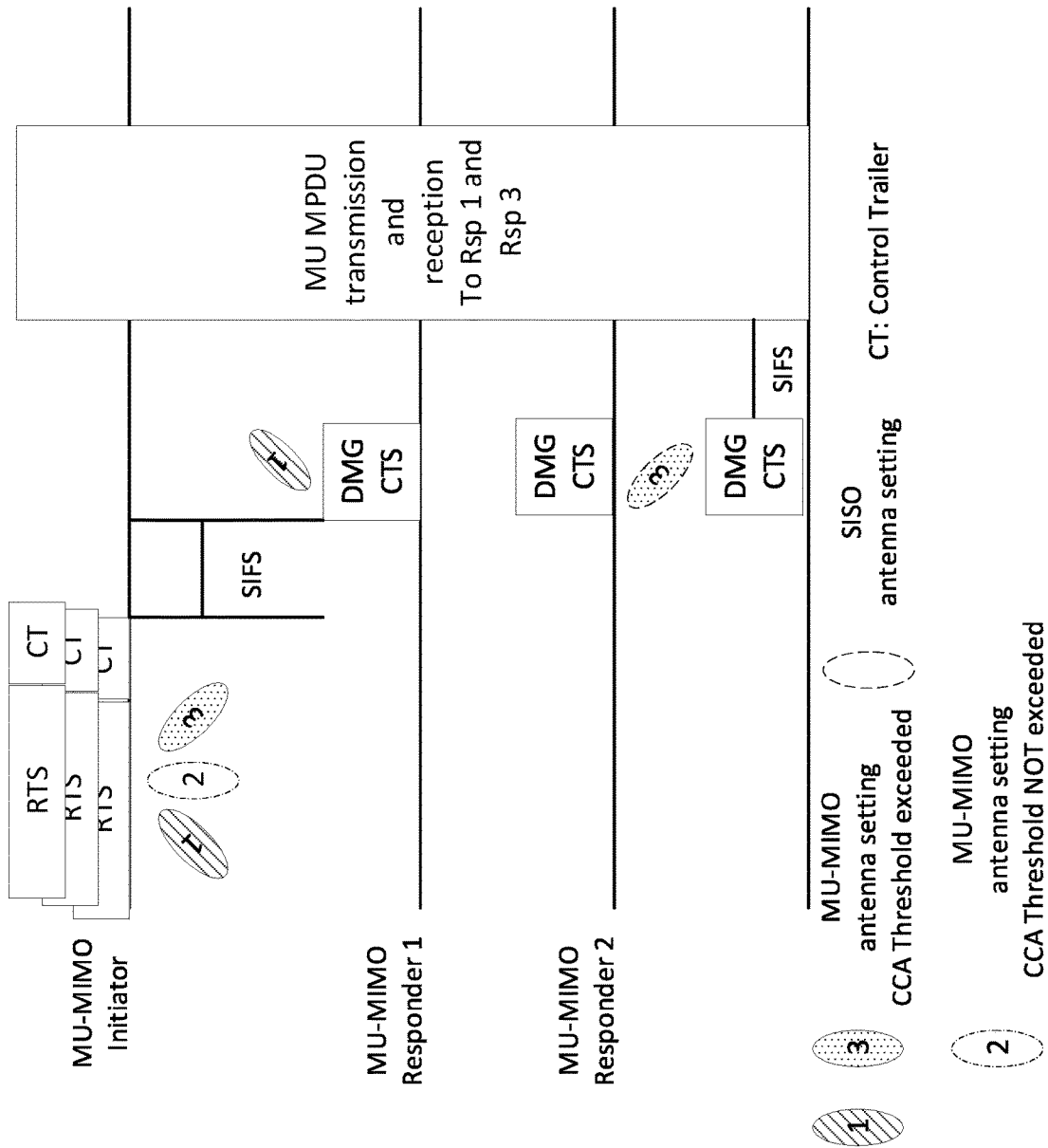
FIG. 17 is an example of a CTS with energy detection.

FIG. 17 is an example of CTS (e.g., common CTS) with energy detection. One or more of the following may apply. The MU-MIMO initiator may send an RTS (e.g., an RTS with CT) to responder 1, responder 2, and responder 3. The AWVs may have been defined during the MU-MIMO beamforming protocol. At a fixed duration after reception of the RTS, the MU-MIMO responders may reply with DMG CTS frames to the MU-MIMO initiator. The MU-MIMO initiator may perform energy detection per receive beam and/or joint decoding of the received signal. The MU-MIMO initiator may identify (e.g., if the received signal is correctly decoded as a DMG CTS) the receive beams with energy levels that exceed a threshold. In examples, the threshold may be mandated by a standard. In examples, the initiator may save the received signal strength for a (e.g., each) STA during the MU-MIMO beamforming protocol and/or may identify transmitting STAs by the STAs in which the received energy exceeds a desired fraction of the saved value. The MU-MIMO initiator may commence MU MAC protocol data unit (MPDU) transmission and reception to Rsp 1 and Rsp 3. The MU-MIMO initiator may transmit dummy information to MU-MIMO responder 2, e.g., to occupy the channel during the transmission to the other STAs.

A NAV setting of MU group STAs may be used. A STA may update the NAV and/or TXOP holder address, when a STA is an intended receiver of a RTS frame for MU-MIMO (e.g., based on the group ID and/or TA of the RTS equal to address of an AP). For example, the STA may update the NAV and/or TXOP holder address based on the duration and/or TA indicated in the RTS (e.g., after it has sent a DMG CTS given that the criteria of sending DMG CTS is met). The setting of the NAV may prevent a STA accessing the channel before the end of entire MU frame exchanges (e.g., if it does not hear the BAR/BA exchange or MU-data transmission).

The RA of RTS for MU-MIMO may be set to a broadcast address or the MAC address of the AP.

The TA of DMG CTS may be set to the MAC address of the AP.

Features, elements and actions are described by way of non-limiting examples. While examples are directed to 802.11 protocols, subject matter herein is applicable to other wireless communications and systems. Each feature, element, action, or other aspect of the described subject matter, whether presented in figures or description, may be implemented alone or in any combination, including with other subject matter, whether known or unknown, in any order, regardless of examples presented herein.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

A single input single output (SISO) data transmission may solicit a multiple input multiple output (MIMO) rank adaptation information. A number of spatial stream for transmission may be determined, e.g., by an access point (AP). A physical layer convergence procedure (PLOP) protocol data unit (PPDU) may be transmitted, e.g., to a station (STA). The PPDU may include data and training (TRN) sequences. The TRN sequences may include orthogonal sequences. The number of TRN sequences may be equal to the number of transmit chains. The PPDU may include information associated with the determined number of transmit chains for transmission. Feedback may be received, e.g., from the STA. The feedback may include information that identifies a transmit chain associated with the transmitted TRN sequences and/or a channel measurement associated with the identified transmit chain. A subsequent (e.g., second PPDU) may be transmitted (e.g., to the STA) based on the channel measurement associated with the identified transmit chain from the received feedback.

Systems, methods, and instrumentalities have been disclosed for MIMO channel access. Duplicate RTS/CTS signaling may be provided, e.g., in a spatial domain, for SU-MIMO. MIMO may be protected (e.g., from interference by unintended STAs), for example, with MIMO rank adaptation. A SISO data transmission may solicit MIMO rank adaptation information. MU-MIMO channel access and protection may be provided, for example, in SP and CBAP. A-BFT may be provided on a secondary channel (e.g., in a duplicate on a primary channel) in a failsafe procedure. A field, a number of SS in TRN/number of TRN transmit chains may be included in an EDGM preamble (e.g., Header-A field) of SC or OFDM PPDUs, for example, to indicate a number of streams to be trained/protected in an appended TRN field.

Although features and elements may be described above in particular combinations or orders, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A station (STA) comprising:
a processor; and
a transceiver;
the processor and the transceiver configured to receive, from an initiating STA, a frame including:
information indicating a broadcast address, and
a control trailer including information indicating that a multi-user multiple input-multiple output (MU-MIMO) frame is to be received from the initiating STA, and information indicative of a plurality of STAs, the plurality of STAs including the STA;
the processor and the transceiver configured to transmit a response frame to the indicated broadcast address based on the received frame; and
the processor and the transceiver configured to receive the MU-MIMO frame from the initiating STA.

2. The STA of claim 1, wherein the initiating STA is an access point (AP).

3. The STA of claim 1, wherein the frame solicits response frames from the plurality of STAs.

4. The STA of claim 2, wherein the frame received from the initiating STA is a request-to-send (RTS) frame and the transmitted response frame is a clear-to-send (CTS) frame.

5. The STA of claim 1, wherein the control trailer includes information indicative of a MU-MIMO antenna configuration.

6. The STA of claim 1, wherein the transmission of the response frame is performed substantially simultaneously with a transmission of a response frame from at least another STA of the plurality of STAs.

7. The STA of claim 1, wherein the response frame is transmitted at approximately the same time as a response frame from at least one other STA of the plurality of STAs, with a small delay between them.

8. A method performed by a station (STA), the method comprising:
receiving, from an initiating STA, a frame including:
information indicating a broadcast address, and
a control trailer including information indicating that a multi-user multiple input-multiple output (MU-MIMO) frame is to be received from the initiating STA, and information indicative of a plurality of STAs, the plurality of STAs including the STA;
transmitting a response frame to the indicated broadcast address based on the received frame; and
receiving the MU-MIMO frame from the initiating STA.

9. The method of claim 8, wherein the initiating STA is an access point (AP).

10. The method of claim 8, wherein the frame solicits response frames from the plurality of STAs.

11. The method of claim 9, wherein the frame received from the initiating STA is a request-to-send (RTS) frame and the transmitted response frame is a clear-to-send (CTS) frame.

12. The method of claim 8, wherein the control trailer includes information indicative of a MU-MIMO antenna configuration.

13. The method of claim 8, wherein the transmission of the response frame is performed substantially simultaneously with a transmission of a response frame from at least another STA of the plurality of STAs.

14. The method of claim 8, wherein the response frame is transmitted at approximately the same time as the response frame from at least one other STA of the plurality of STAs, with a small delay between them.

15. A station (STA) comprising:
a processor; and
a transceiver;
the processor and the transceiver configured to transmit a frame including:
information indicating a broadcast address, and
a control trailer including information indicating that a multi-user multiple input-multiple output (MU-MIMO) frame is to be transmitted by the STA, and information indicative of a plurality of STAs;
the processor and the transceiver configured to receive, from at least one of the plurality of STAs, a response frame that is addressed to the indicated broadcast address; and
the processor and the transceiver configured to transmit the MU-MIMO frame to the plurality of STAs.

16. The STA of claim 15, wherein the STA is an access point (AP).

17. The STA of claim 15, wherein the frame solicits response frames from the plurality of STAs.

18. The STA of claim 16, wherein the frame transmitted to plurality of STAs is a request-to-send (RTS) frame and received response frame is a clear-to-send (CTS) frame.

19. The STA of claim 15, wherein the control trailer includes information indicative of a MU-MIMO antenna configuration.

20. The STA of claim 15, wherein the response frame is received substantially simultaneously with a response frame from at least another one other STA of the plurality of STAs.

* * * * *